(12) United States Patent
Wijegunawardana

(10) Patent No.: US 11,442,594 B1
(45) Date of Patent: *Sep. 13, 2022

(54) DIGITAL PRODUCT NAVIGATION TOOL

(71) Applicant: NATIONWIDE MUTUAL INSURANCE COMPANY, Columbus, OH (US)

(72) Inventor: Mahesh Wijegunawardana, Gahanna, OH (US)

(73) Assignee: Nationwide Mutual Insurance Company, Columbus, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/337,510

(22) Filed: Jun. 3, 2021

Related U.S. Application Data

(63) Continuation of application No. 16/669,923, filed on Oct. 31, 2019, now Pat. No. 11,029,806.

(51) Int. Cl.
| | |
|---|---|
| *G06F 3/048* | (2013.01) |
| *G06F 3/04815* | (2022.01) |
| *G06F 3/04812* | (2022.01) |
| *G06Q 40/06* | (2012.01) |
| *G06Q 40/08* | (2012.01) |
| *G06F 3/0482* | (2013.01) |

(52) U.S. Cl.
CPC ........ G06F 3/04815 (2013.01); G06F 3/0482 (2013.01); G06F 3/04812 (2013.01); G06Q 40/06 (2013.01); G06Q 40/08 (2013.01)

(58) Field of Classification Search
CPC .. G06F 3/04815; G06F 3/0482; G06F 3/0483; G06F 3/04842; G06F 8/34; G06F 16/248; G06F 16/334; G06F 16/9024; G06Q 40/06; G06Q 40/00; G06Q 30/0253; G06Q 30/0631

See application file for complete search history.

(56) References Cited

U.S. PATENT DOCUMENTS

| | | | | |
|---|---|---|---|---|
| 6,363,375 | B1 * | 3/2002 | Hoshino | G06F 16/3323 |
| 8,982,129 | B1 * | 3/2015 | Broekhuijsen | G06F 16/9024 707/736 |
| 9,465,511 | B1 * | 10/2016 | Cline | G06F 3/04817 |
| 10,824,631 | B2 * | 11/2020 | Rikukawa | G06F 16/248 |

(Continued)

OTHER PUBLICATIONS

Ai Ishida et al., Visual Analysis Tool for Hierarchical Additive Time-Series Data, 2015, IEEE, 6 pages.*

(Continued)

*Primary Examiner* — Linh K Pham
(74) *Attorney, Agent, or Firm* — Thomas E. Lees, LLC

(57) ABSTRACT

A graphical user interface generates a control pane and a diagram pane. The control pane graphically depicts control objects that are each associated with a different viewpoint of digital products. The diagram pane displays graphical representations based upon a user-selected control object in the control pane. In use, a hierarchical view of digital products is presented in the diagram pane. A user can select a digital product from the hierarchical view, and then graphically navigate the digital product, whereby the graphical user interface presents aspects of the digital product, represented as nodes and interconnecting lines in different views defined by the viewpoint associated with user-selected control objects available in the control pane.

8 Claims, 25 Drawing Sheets

(56) References Cited

U.S. PATENT DOCUMENTS

| | | | |
|---|---|---|---|
| 2011/0141109 A1* | 6/2011 | Radet | G06F 3/0481 |
| | | | 715/850 |
| 2011/0307839 A1* | 12/2011 | Liao | G06F 3/0481 |
| | | | 715/854 |
| 2014/0067613 A1* | 3/2014 | Singhal | G06Q 30/0641 |
| | | | 705/26.62 |
| 2014/0143736 A1* | 5/2014 | Huang | G06Q 10/06 |
| | | | 715/854 |
| 2015/0066944 A1* | 3/2015 | Majidian | G06F 16/9024 |
| | | | 707/741 |
| 2015/0256428 A1* | 9/2015 | Li | H04L 41/12 |
| | | | 370/254 |
| 2018/0182030 A1* | 6/2018 | Arai | G06Q 30/0242 |
| 2019/0258745 A1* | 8/2019 | Gavrylyuk | G06F 16/9038 |
| 2019/0278815 A1* | 9/2019 | Capon | G06F 16/958 |

OTHER PUBLICATIONS

Huang et al., A Zoomable Shopping Browser Using a Graphic-Treemap, 2009, IEEE, 5 pages.*

* cited by examiner

US 11,442,594 B1

DIGITAL PRODUCT NAVIGATION TOOL

CROSS REFERENCE TO RELATED APPLICATIONS

This application is a continuation of U.S. patent application Ser. No. 16/669,923, filed Oct. 31, 2019, now allowed, entitled "DIGITAL PRODUCT NAVIGATION TOOL", the disclosure of which is hereby incorporated herein by reference.

BACKGROUND

Various aspects of the present disclosure relate generally to computer-implemented tools that enable users to visually navigate digital product specifications.

Visualization is a general term that describes the display of information in a visual form that assists the user in understanding the underlying information. For instance, visualization is often employed using a graphical arrangement that emphasizes an important parameter in an underlying data set. Accordingly, a visualization can be used to identify patterns, trends, and correlations that might go undetected in conventional data formats.

BRIEF SUMMARY

According to aspects of the present disclosure a computer-implemented process of generating user-navigable, graphical representations is provided. The process comprises generating, by a graphical user interface, a control pane and a diagram pane for output to a computer display. Here, the control pane graphically depicts control objects that are each associated with a different viewpoint of digital products. Moreover, the diagram pane displays graphical representations based upon a user-selected control object in the control pane.

The process also comprises generating, by the graphical user interface in the diagram pane, a view of a user-selected digital product, where computer readable information associated with the user-selected digital product is graphically associated with (i.e., visually represented by) nodes and lines visually interconnect nodes based upon determined relationships therebetween. Additionally, the process comprises performing, based upon a user-selected control object in the control pane, decomposing the digital product into an entity diagram of entity nodes connected by lines, where the entity nodes are defined based upon the viewpoint associated with the user-selected control object, and presenting, via the graphical user interface, the entity diagram in the diagram pane.

In some embodiments, a select control object in the control pane represents product hierarchies. In this regard, the process further comprises generating, by the graphical user interface in the diagram pane, a hierarchical view of digital products by presenting, via the graphical user interface, a product hierarchy diagram in the diagram pane, wherein digital products are visually represented as nodes, and by receiving, via the graphical user interface, a user selection of a node displayed within the diagram pane, designating the user-selected digital product.

DETAILED DESCRIPTION

Figure 1:
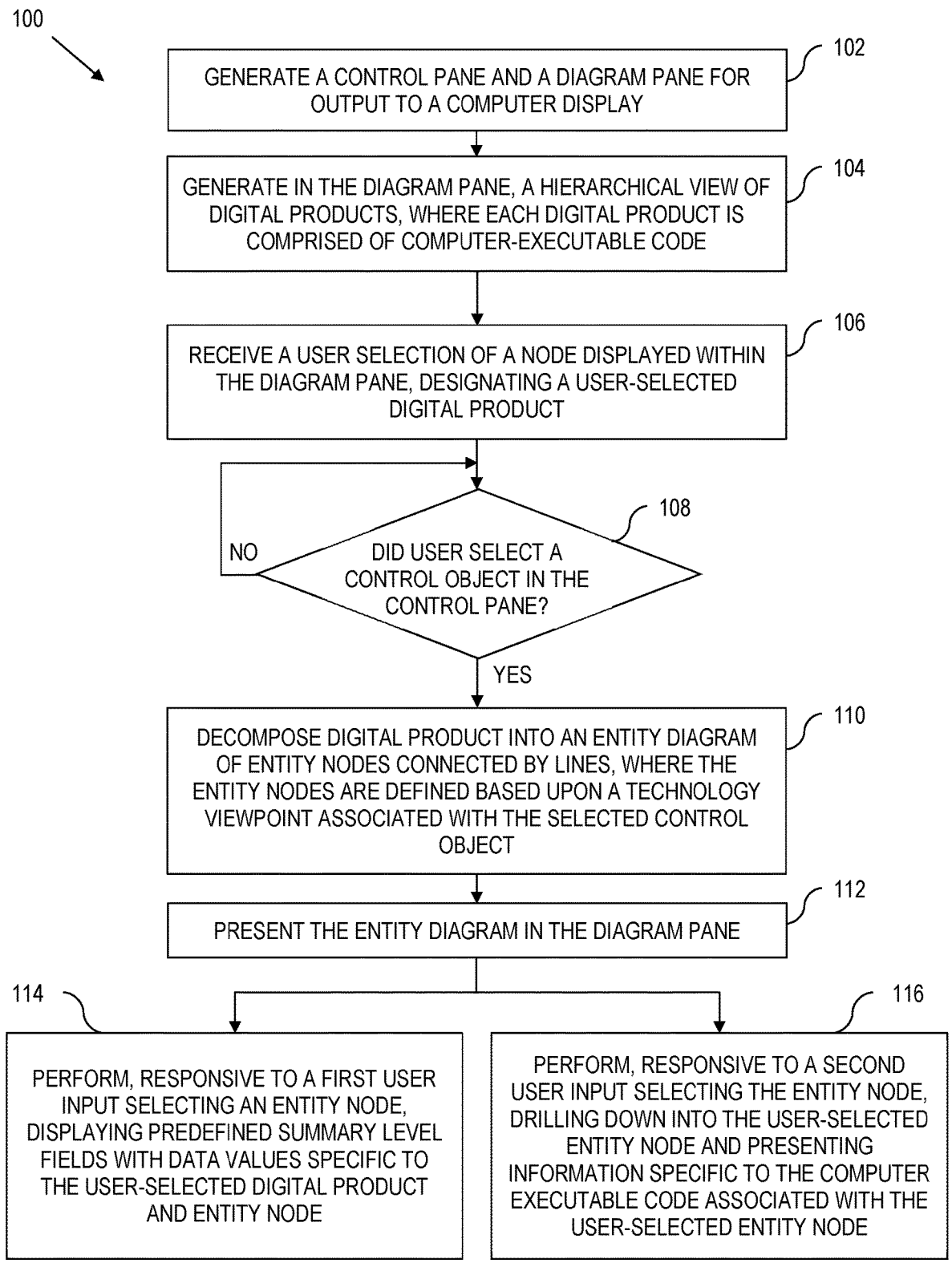
FIG. 1 is a flow chart illustrating example flows of a tool implementing a computer-implemented process of generating user-navigable, graphical representations.

Products such as the Oracle Insurance Policy Administration (OIPA) system provide a rules-based administrative platform for modeling and deploying rules (e.g., business rules) within enterprise applications. Essentially, OIPA transforms legislation and policy documents into executable rules. By way of example, in the context of an insurance company, OIPA can be used to support the development of policy, billing, collections, processing, claims, and other capabilities on a common platform. In this regard, as applications scale in size, number, and complexity, it can become difficult to effectively manage the corresponding portfolio of OIPA resources. Moreover, specialized individuals are required that understand the technology stack that OIPA applications support, and specialized individuals are required that understand the syntax required to implement activity processing within OIPA.

However, aspects herein address the above-problem with an unconventional solution thereto by providing a computer-implemented tool and corresponding process that enables users to efficiently interact with, e.g., view, modify, build, etc., digital products in a visual computing environment. For instance, the tool can be used to visualize digital products that were created in OIPA.

For instance, digital products are represented in a modular manner, enabling resources to be visually rendered in a readily understood format. Moreover, the modular construction described herein enables digital products to be represented as "blueprints", e.g., "assembly" visualizations, that enable drill down into multiple "views" of product specifications, each view providing different perspectives of the digital product.

For instance, a digital product, e.g., implemented in OIPA, may have many different viewpoints, where each viewpoint represents a subset of the computer readable information within the digital product that is associated with a part (e.g., a topic, subject matter, view, subset of related content, etc.,) of the electronic product that is of interest to a user. Here, the viewpoints may be technology specific, entity specific, content specific, based upon the role of the user interacting with the digital product, etc. For instance, a single digital product may include "parts" that describe a policy lifecycle, screens, rates, interfaces, database objects, maps, codes, funds, commissions, suspense, etc., examples of which are described in greater detail herein.

In some embodiments, each defined viewpoint represents a general framework of a "view" of the digital product that is consistent across electronic products. In practical applications, a particular viewpoint may or may not be applicable to every digital product. However, the available viewpoints are used for each digital product analyzable by the system. In other embodiments, selection of an electronic product may inform the system to the necessary viewpoints, e.g., via metadata stored in a database that is associated with the digital product. Thus, the viewpoints may be fixed, or dynamic, e.g., based upon the selected electronic product or other user-selection.

Regardless, each viewpoint includes program data that informs a rules engine how to parse the OIPA information associated with an electronic product such that when the system herein decomposes a digital product into a diagram based upon a user-selected viewpoint, the system program code knows the types of OIPA information associated with nodes, transactions, interconnecting lines, and other visual elements graphically represented or presentable in a diagram pane that are associated with the user-selected viewpoint. Thus, when a digital product is decomposed, the rules engine implements rules that map out parsed OIPA information, including parsed OIPA executable rules, based upon node definitions, transaction definitions, connecting line definitions, etc.

In some embodiments, a user can zoom in and out of an organization's products, drilling down from a corporate level, into layer(s) of products. Once a software product is selected, the user can drill down into the software product in multiple specification viewpoints (also referred to herein generally as views, entity views or technology specific views, depending upon context). As such, a user can visually navigate through "component level" views, "sub-assembly level" views, "product level" views, "company level" views, etc., as will be described in greater detail herein.

Notably, in example embodiments, a hierarchy represents how different products configured in OIPA are organized or classified (and may thus not represent the details of those products). In this manner, subsequent diagrams depict an individual product's details at different levels, and from different viewpoints. For instance, a specific product can be thought of as represented by a box in a bottom level (leaf level or plan level) of a Product Hierarchy diagram. The boxes above that level may thus show how that product is classified for ease of reference.

Further, aspects herein enable rapid inspection of a digital product, facilitating speed-to-market gains for new products, features, documentation, and enhancements. Moreover, aspects herein provide the ability to quickly analyze and resolve issues in product design by providing viewpoint level views of digital products. Yet further, aspects herein provide the ability to quickly communicate product details without having to collect and write down information manually. Given the complexity of many electronic products, this can save the need to potentially manually organize thousands of pages of product details (for a single product). Also, aspects herein eliminate hand-offs of those details from one organizational area to another across multiple such areas.

According to further aspects herein, a tool enables a user to quickly visualize the specifications of digital products, e.g., from the details implemented in an associated system, e.g., the Oracle Insurance Policy Administration (OIPA) system. The specifications can be at different levels of details and depict the product from different viewpoints. Moreover, in some embodiments, an underlying system such as OIPA may not be available. As such, the digital products may be decoupled from a single, underlying system.

Without the advantages of the tool described herein, a user would have to manually scan thousands of complex rules and other data in the system to understand how an existing product works, which involves tediously tracing how various variables are calculated by various components. Moreover, aspects herein avoid or minimize the need to maintain a set of documents that contain this information in parallel to maintaining the system as enhancements and defect fixes are made by various teams over the years. Rather, a tool herein captures such information directly from the product configuration defined in the system and displays the information in an easy to reference visual manner, preventing the need to create and maintain additional documentation.

Example Computer Interaction

Referring now to the drawings, and in particular to FIG. 1, a flow chart illustrates an example computer-implemented process 100 of generating user-navigable, graphical representations.

The computer-implemented process 100 comprises generating at 102, by a graphical user interface, a control pane and a diagram pane for output to a computer display. In an illustrative embodiment, the control pane graphically depicts control objects that are each associated with a different viewpoint of digital products. Likewise, the diagram pane displays graphical representations based upon a user-selected control object in the control pane. Nonlimiting examples of such an embodiment are described more fully herein, e.g., with reference to FIG. 2A through FIG. 22.

In some embodiments, e.g., where it is desirable to provide a start or launching point, the computer-implemented process 100 comprises generating at 104, by the graphical user interface, a hierarchical view of digital products in the diagram pane. In the illustrated examples herein, each digital product is comprised of computer readable information and is graphically associated with a node. Moreover, interconnecting lines visually interconnect nodes based upon determined hierarchical relationships between the digital products.

For instance, in some embodiments, the hierarchy graphically displays a hierarchy of companies, optionally child-companies, products, optionally sub-products, plans, combinations thereof, etc. In this regard, the computer-implemented process 100 comprises receiving at 106, via the graphical user interface, a user selection of a node displayed within the diagram pane, designating a user-selected digital product.

Keeping with the example embodiment, nodes within the diagram pane may be selected for further examination. In some embodiments, a manner that a node is selected may determine an associated operation, enabling different methods of selecting a node to produce different results. For example, a single left-click may provide a different operation than a double left-click, etc. As an illustration, a single-click can show certain detail about a project in a separate pane (e.g., a summary pane), whereas a double-click can display a diagram in the diagram pane at a next drill-down level.

The computer-implemented process 100 further comprises performing, based upon a user-selected control object in the control pane (e.g., determining at 108, whether the user selected control object in the control pane) one or more operations. Notably, depending upon the implementation, flow may jump from generating at 102 to detecting the user selection of a control object at 108. Other embodiments may include one or more of intermediate operations including generating the hierarchical view at 104 and/or receiving the user input at 106.

For instance, the computer-implemented process 100 may carry out an operation, such as generating, by the graphical user interface in the diagram pane, a view of a user-selected digital product, where computer readable information associated with the user-selected digital product is graphically associated with nodes and interconnecting lines that visually interconnect nodes based upon determined relationships therebetween.

Moreover, the computer-implemented process 100 can carry out performing, based upon a user-selected control object in the control pane, decomposing at 110, the digital product into an entity diagram of entity nodes connected by interconnecting lines, where the entity nodes are defined based upon the viewpoint associated with the user-selected control object. In an example embodiment, an entity diagram is a diagram that can be used to describe various products, which is visually generated within the diagram pane. For instance, entity diagrams can utilize a standard set of symbols (shapes, colors, line styles, etc.) to quickly identify specific types of entities that are displayed via nodes in the diagram pane.

The computer-implemented process 100 also comprises presenting at 112, via the graphical user interface, the entity diagram in the diagram pane.

In some embodiments, the computer-implemented process 100 can optionally carry out operations such as performing at 114, responsive to a first user input selecting an entity node, displaying predefined summary level fields with data values specific to the user-selected digital product and entity node.

The computer-implemented process 100 can also optionally carry out operations such as performing at 116, responsive to a second user input selecting the entity node, drilling down into the user-selected entity node and presenting information specific to the computer readable information associated with the user-selected entity node.

The above capabilities and additional capabilities are described herein in greater detail below, with specific reference to an example application.

Example User Interface

Figure 2A:
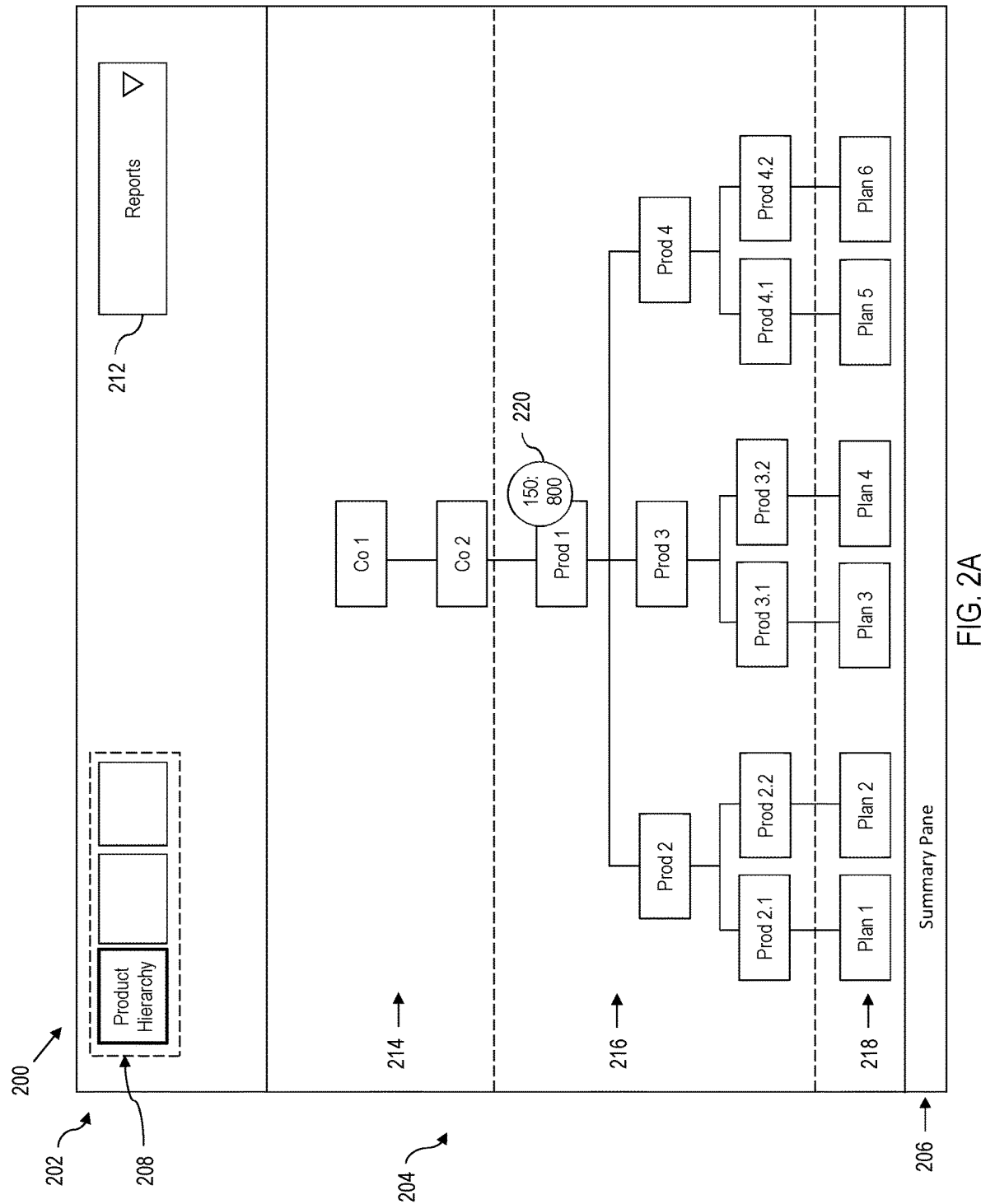
FIG. 2A is a schematic diagram of a computer interface having a control pane and a navigation pane, where an example view is illustrated in the diagram pane.
Figure 2B:
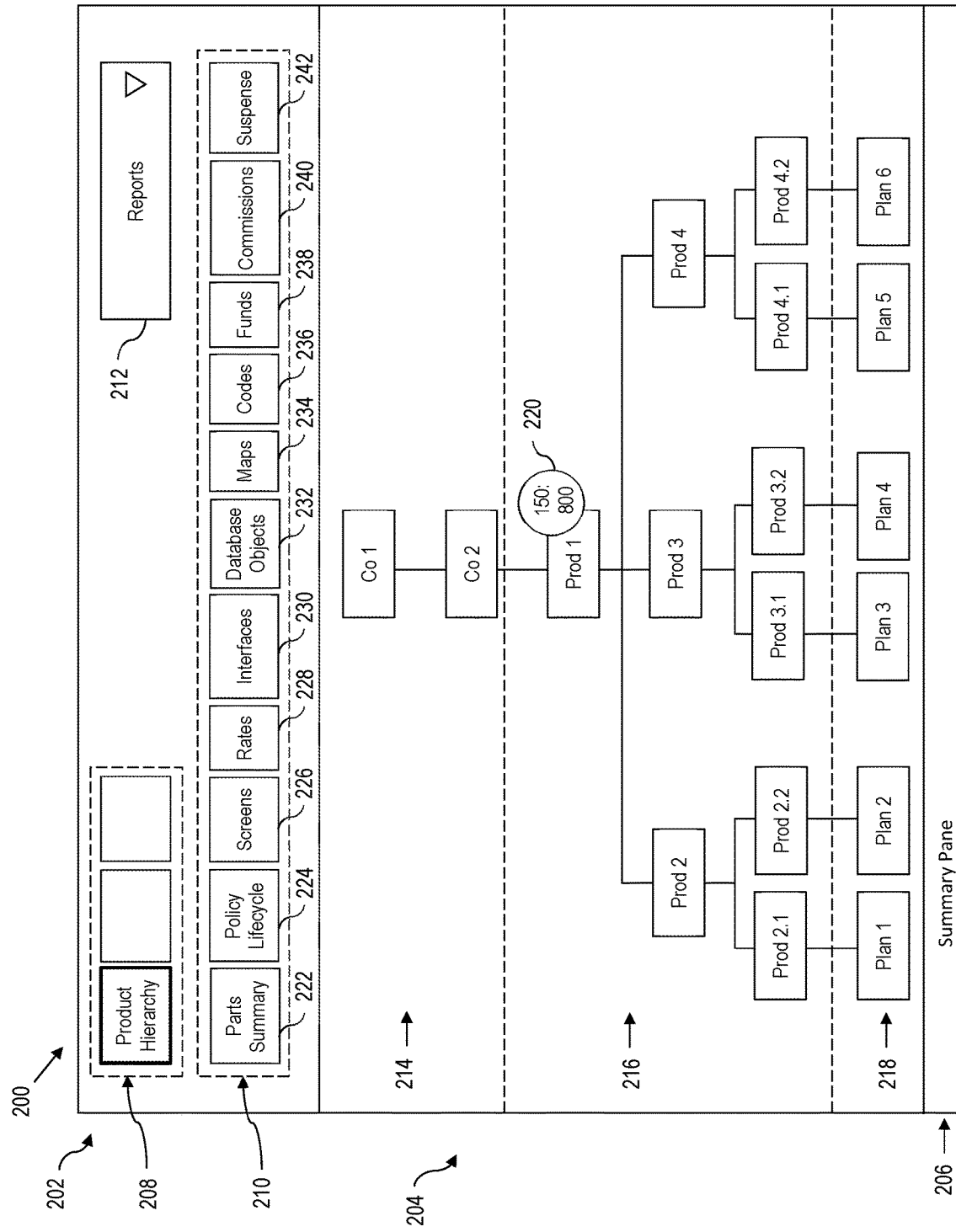
FIG. 2B is another example schematic diagram of a computer interface having a control pane and a navigation pane, where an example view is illustrated in the diagram pane.

Referring now to FIGS. 2A and 2B, a tool that implements a computer-implemented process of generating user-navigable, graphical representations, includes a graphical user interface 200, according to aspects of the present disclosure herein. The graphical user interface 200 can be implemented, for instance, on a display screen of a processing device such as a desktop computer, laptop computer, tablet, or other suitable device. In this example configuration, the processing device can interact with a server remotely, e.g., via a web browser or other interface to carry out the features and capabilities described more fully herein, including the process of FIG. 1. Thus, the processing herein can take place by the tool (e.g., on a server), on a remote processing device (e.g., desktop computer), or a combination thereof (e.g., via exchanges of information over a computer network).

In a working example, a product hierarchy shows how products are organized or grouped, e.g., in OIPA for classification purposes. In this working example, the organization provides a way to categorize products in a way that is meaningful to the entity that uses OIPA (ex: Annuities vs Life Insurance products, or Deferred Annuities vs Immediate Annuities, or Fixed Annuities or Variable Annuities, etc.).

The graphical user interface 200 visually depicts a control pane 202, a diagram pane 204, and an optional summary pane 206. While the graphical user interface illustrates one possible orientation of the control pane 202, diagram pane 204, and summary pane 206, other configurations are possible (e.g., the summary pane 206 may be a vertical pane on the right instead of the horizontal pane at the bottom). Also, other combinations, including more panes, less panes, etc., can be utilized depending upon the implementation. The control pane 202 generally controls the view that is presented in the diagram pane 204. Relevant information in presented in the optional summary pane 206 depending upon the user interaction, and the state of the tool, as described more fully herein.

The illustrated control pane 202 includes one or more control objects, which can be implemented as buttons, menus, tabs, check boxes, or other option selection implementations, combinations thereof, etc. As will be described in greater detail below, user selection of an object in the control pane 202 triggers the tool to generate a corresponding diagram in the diagram pane 204.

Referring to FIG. 2A, in an example embodiment, the default state provides a row of control objects (e.g., tabs, menus, options, etc.), referred to herein as level one control objects 208. This approach may be desirable where maximizing the space available in the diagram pane 204 is desirable.

Solely for purposes of clarity of description, and not by way of limitation, FIG. 2B illustrates the control pane 202 in an alternative embodiment. More specifically, for sake of illustration of the flexibility of the tool, at least two levels of control objects (e.g., tabs, menus, options, etc.) are illustrated in the control pane 202 including level one control objects 208 and level two control objects 210.

Referring generally to FIGS. 2A and 2B, in addition, a drop-down list of reports 212 is displayed to the right in the control pane 202 and is aligned with the level one control objects 208. Other optional controls may also be provided. For instance, an optional drop-down list may include a choice of regions within the associated system (e.g., Development, Test, Production, etc.) to point the tool to a region in use. For instance, a region drop-down can be used to point the tool to one of many regions of OIPA in use, e.g., a development region, where all new configuration work takes place. The tool can thus remember a previous region chosen last and auto-select a region upon a next startup. Also, the region drop-down can keep show and switch to a Product Hierarchy tab/object when a region is selected.

In an example implementation, the level one control objects 208 represent business levels. In alternative embodiments, the level one control objects 208 can resemble a drill down-order from left to right where each control object (e.g., tab as illustrated) contains more and more detail levels. For instance, in the illustrated example, the level one control objects 208 include a "Product Hierarchy" control object, however, additional control objects can optionally be provided.

Referring to FIG. 2B, in the illustrated example, level two control objects 210 represent technology specific level options (e.g., OIPA specific options) and each represent different viewpoints (i.e., views from different angles, perspectives, user roles, topics, focus points, etc.,) of a scope chosen based upon user-selection of a digital product of interest. Notably, even the nodes and lines displayed in the Product Hierarchy diagram (e.g., responsive to a user selecting the level 1 Product Hierarchy control object) and/or the nodes and lines in the diagram pane responsive to user-selection of other level 1 control objects, may be OIPA specific. Here, the nodes and lines illustrated in the diagram pane responsive to level 1 control objects 208 are closer to higher business levels than the nodes and lines displayed in the diagram pane responsive to a user selecting level 2 control objects 210.

In an example embodiment, user selection of a control object (e.g., clicking, double-clicking, tapping, navigating and selecting, etc., a control object in the level one control objects 208) sets the scope of other level one control objects 208 and sets the scope of level two control objects 210. Moreover, in some embodiments, for level two control objects 210, the scope should include any rules which are applicable to a chosen entity, via all mechanisms such as global, overriding, inheritance, etc.

Additionally, in an example embodiment, a consistent navigation structure is implemented by the tool across all control objects in the control pane 202. For instance, in an example embodiment, a first user input, e.g., a single-click, triggers the tool to display/update information presented in the summary pane 206 with information relevant to that user-selection. Notably, the summary information can be displayed on other areas of the screen in the alternative. A second user input, e.g., a double-click, triggers the tool to drill-down to the next level relevant to that user-selection, and switch to an associated diagram.

In an example embodiment, when the user selects (e.g., double clicks) an item in the product hierarchy, the graphical user interface 200 drills down to level 2 (i.e.: displays or enables remaining level one control objects 208 and level two control objects 210), and places the user in a parts summary (described more fully herein). The graphical user interface 200 further enables the user to switch to other level one control objects 208, drill-down deeper in the illustrated parts summary, or switch to another viewpoint by selecting an associated level two control object 210.

Throughout the various diagrams discussed further below, the graphical user interface can implement various caching functions, e.g., to enable the system to either get the latest data, or to use cached data, e.g., depending upon user setting, depending upon other factors, etc.

Example Level One Diagram—Product Hierarchy

In an example embodiment, a product hierarchy diagram (i.e., top-most level) is generated by the graphical user interface for display in the diagram pane 204. The product hierarchy diagram can be displayed whenever a user selects the Product Hierarchy object within the level one control objects 208 of the control pane 202, when the application is launched, etc. In some embodiments, the hierarchy diagram is shown by default when the region within the associated system (e.g., Development, Test, Production, etc.) is chosen by the user. As such, the graphical user interface may initially display the product hierarchy diagram, e.g., before drilling down into specific product details.

In an illustrative implementation (see FIG. 2A), only a "Product Hierarchy" tab of the level one control objects 208 and the drop-down list of reports 212 are visible (or enabled). Here, the level two control objects 210 are all disabled, hidden, etc. In alternative embodiments (e.g., see FIG. 2B) the level two control object 210 may be visible, but may be disabled, inactive, etc.

In some embodiments, the product hierarchy diagram may default to a pre-set zoom level (e.g., zoomed all the way out). In other embodiments, the product hierarchy may auto-size to some predefined zoom, or some other decision logic can determine an initial starting state.

By way of illustration, and not by way of limitation, a product hierarchy in the diagram pane 204 is graphically represented as hierarchical layers of nodes interconnected by lines, such as by including an upper layer 214, a middle layer 216, and a lower layer 218, where each node corresponds to a discrete part, and each interconnecting line designates an associated relationship (e.g., a spatial relationship).

For instance, as illustrated, the upper layer 214 displays nodes representing company nodes, and optionally, child-company nodes corresponding to a parent/child company hierarchy. However, other relationships may be used when determining spatial relationships. For instance, in an example embodiment using OIPA, the relationships can be parent-child relationships for the purpose of categorizing products into logical groupings. This hierarchy is configured in OIPA, and the diagram depicts that configuration. In an example embodiment, the upper layer of company nodes can be visually represented by a first color.

The middle layer 216 displays nodes representing product nodes, e.g., digital products and optionally, at least one sub-product node corresponding to a parent/child products hierarchy. In an example embodiment, the middle layer of product nodes can be visually represented in a second color.

The lower layer 218 displays nodes corresponding to a plan layer where the lowest branch in the products hierarchy ends in an associated plan node. Thus, there may be a lower layer of plan nodes below the product nodes. Thus, a bottom node (leaf node) in a branch of the product hierarchy diagram can be a plan node. In an example embodiment, the lower layer 218 is a single layer deep whereas the upper layer 214 and middle layer 216 can have as many levels as deemed appropriate. In an example embodiment, the lower layer nodes can be visually represented in a third color. Moreover, in some embodiments, drill down may only apply to nodes in the lower layer 218.

In practice, other hierarchy views can be implemented based upon the specific context of the application. In some embodiments, drilling-down, e.g., by tapping, double-clicking or other assigned input command, can apply to only select nodes, e.g., nodes at the bottom level of the hierarchy. However, any node can be selected, (e.g., single-clicked) to find additional relevant information via the summary pane 206.

In an example implementation, when a user selects a node (e.g., via keyboard navigation, mouse click, touch gesture or other navigation-based command), the graphical user interface 200 exposes additional options, such as by enabling additional objects within the control pane 202, e.g., displaying or enabling remaining level one control objects 208 and/or level two control objects 210 (see FIG. 2B), etc. In some embodiments, the tool places the visualization in a level two control object 210 by default, e.g., by placing the visualization in the "Parts Summary" object. From there, the user can navigate as desired, e.g., to switch to a level one control object 208, or drill-down deeper in the illustrated Parts Summary object based upon the active viewpoint, or switch the viewpoint by selecting any of the other level two control objects 210. Moreover, the graphical user interface 200 can show information in the summary pane 206 responsive to a single-click and show a next deeper level diagram (i.e.: drill-down) responsive to a double-click (e.g., where a deeper level is available).

In some embodiments, the graphical user interface 200 can display summary information of the selected node within the summary pane 206. As a few examples, upon detecting a first user selection of a company node, the summary pane 206 can display a number of overridden rules (e.g., transactions, rules by type) for all products associated with the user-selected company node, a number of policies associated with the user-selected company node, other contextual information, or combinations thereof.

Likewise, the graphical user interface 200 can display, upon detecting a first user selection of a product node, a number of overridden rules (e.g., transactions, rules by type) for the user-selected product node, a number of policies associated with the user-selected product node, other contextual information, or combinations thereof. Analogously, the graphical user interface 200 can display, upon detecting a first user selection of a plan node, a number of overridden rules (e.g., transactions, rules by type) for the user-selected plan node, a number of policies associated with the user-selected plan node, other contextual information, or combinations thereof.

Selecting a node (e.g., via double clicking on a plan node) on the diagram in the display pane 204 displays a drill-down to level two and displays a default object, e.g., a Parts Summary tab as illustrated. Alternatively, the user may be able to drill down to other level one tabs as well.

Also, visual indicia 220, e.g., a yellow circle overlapping the top right corner of an object node can be optionally used to provide additional information. By way of example, visual indicia 220 can be implemented using the format "<transaction count>:<rule count>" (e.g., 150:800 for 150 transactions and 800 business rules). In practical applications, colors or other visualizations can be used to identify and distinguish entities, companies, products, and plans with glanceable information, as the specific application dictates.

Reports

The drop-down list of reports 212 is enabled when a company is chosen in the upper layer 214 of a level one diagram (e.g., Product Hierarchy). As such, in an illustrative example, the report's context is limited to all items applicable to that entity. In addition to viewing online, the tool can output the report, e.g., to a printer, file, etc.

User selection of a field catalog triggers the graphical user interface 200 to scan program information linked to a company. All fields configured on any screen or transaction within the chosen context is extracted, alphabetized and output. In this regard, the tool assembles information for each field, including by way of limitation, field name, description (displayed name), type, data type, defaulting expression, entity where located (screen, transaction, etc.), precision or length, etc.

User selection of an I/O variable catalog triggers the tool to scan configuration information (e.g., rules associated with the product, configuration data, etc.), and generate a list of input/output variables in any configuration within the chosen context. As another example, when viewing the math of a transaction, screen, or an interface as a black box, the tool implements processing that considers any variables that go into it and any variables that come out of the math being analyzed, excluding any intermediate variables. In an example embodiment, the tool classifies inputs as those variables that come into the black box from entity fields (policy, segment, etc.), from a DB object (via SQL), etc. The tool classifies outputs as those variables that come out of the black-box, such as those that are logged, used in a condition that affects an output of a transaction (e.g., conditional spawn, conditional status update, etc.), or directly affects an output (final calculated withdrawal amount that is debited, etc.). The tool can further present data associated with the variable, examples of which are analogous to the field catalog, above.

User selection of a complete variable catalog triggers the tool to scan configuration information and generate a list of variables used in any configuration within the chosen context. The complete variable catalog shows variable information, such as variable name, type, data type, defaulting expression, entity where located (screen, transaction, etc.), precision or length, etc.

User selection of a transaction catalog triggers the tool to scan configuration information and generate a list of all transactions from all levels applicable to the chosen level one entity via global, overriding, or inheriting functions.

User selection of a part re-use catalog triggers the tool to scan configuration information and generate a list of code modules (copybooks, OIPA functions, stored-procedures, SQL statements, database views, database functions, etc.) that are re-used across more than one object (transactions, business rules, functions, interfaces, etc.). In an example implementation, the tool collects information, including for example, code module name, code module type, name of object that use it, type of object, and any information that would help locate the object (GUID, override level, etc.).

User selection of a list of parts catalog triggers the tool to scan configuration information and generate a list of different types of objects and code modules that are used throughout the configuration for a product (e.g., transactions, screens, interfaces, extensions, etc.) for a given product.

User selection of a state approvals report triggers the tool to scan configuration information and generate a list of segment names and plans showing the states where the listed segment names and plans are approved.

User selection of a security grid report triggers the tool to scan configuration information and generate a list of users by security roles showing who has which role.

User selection of an attached rules by transactions report triggers the tool to scan configuration information and generate a list of all transactions applicable to the current scope with all the attached rules used by each transaction.

Level Two—Parts Summary

User selection of a Parts Summary control object 210 (i.e., level two control objects 210 of the control pane 202) or, in some embodiments, user selection of a "Product Hierarchy" control object 208 of level one triggers the tool to enable the remaining level two control objects, discussed below. While particular features of each level two control object 210 are discussed independently, there are some common features across the visualizations. For instance, each selection triggers the tool to generate a diagram that summarizes at a glance, the high-level nodes (types of parts) defined in a configuration, e.g., an OIPA configuration in the example illustrations. In practical applications, only those parts that are in scope for the chosen level one control object are displayed. The level two parts summary diagram provides the user a place to start drilling-down into more technology specific detail levels. Optionally, the user can switch to each respective level two control object 210 in the control pane 202, to drill into each separate type of technology specific viewpoint.

As a non-limiting, and non-exhaustive example, the tool generates nodes for presentation in a diagram such that a single node is graphically illustrated per feature of interest. The tool generates data that can be displayed within the diagram, such as statistics of each node represented by visual indicia 220 (e.g., indicated within parenthesis next to the node). In a practical example, the statistics are displayed in a yellow circle overlapping the top right corner of the node, etc. The tool filters the statistics to those that are in scope for the chosen object. Also, the tool causes a presentation on the diagram of any high-level interaction configured between relevant features as interconnecting lines where applicable, and where they make sense (e.g., transactions in Policy Life Cycle interacts with Screens by updating and reading screen fields, sends messages via real-time Interfaces, etc.). Arrows indicate direction of the interaction.

Referring specifically to FIG. 2B, in a practical example, the control pane 202 generates control objects defining a number of "viewpoints", where each viewpoint represents a different view or part of the blueprint of the associated electronic document. For instance, as illustrated, the tool graphically displays any one or more of the following viewpoint entities on the Parts Summary diagram:

Policy Lifecycle 224 (<status count>:<transaction count>);

Screens 226 (number of screens—Policy, Segments, Client, Roles, etc.);

Rates 228 (number of rate types);

Interfaces 230 (number of interfaces like External Client, Process File, Scheduled Valuation, Exposed Computation, etc.);

Database Objects 232 (number of views, DB functions, etc.);

Maps 234 (number of AsMaps);

Codes 236 (number of Code Names);

Funds 238 (number of variable, fixed, & indexed funds as <variable>:<fixed>:<indexed>);

Commissions 240 (number of commissionable events);

Suspense 242 (number of suspense fields).

Other entities can also be provided. As an example, a Re-Use entity can be defined as (<number of CopyBooks>: <number of user defined OIPA functions>). Yet further, the specific application may dictate other entities/

A detailed description of an example implementation of each separate viewpoint entity diagram corresponding to each separate tab is given below. Drill-down levels within each tab are represented by the depth of tabbing from the left margin. However, in practice, other ways may be used to represent drill-down levels.

Policy Lifecycle Diagram

User selection of the Policy Lifecycle control object 224 triggers the tool to generate for display in the diagram pane 204, a state diagram representing a policy lifecycle of an insurance policy. The diagram is generated by decomposing the associated digital product into an entity diagram of entity nodes connected by lines, where the entity nodes are defined based upon the viewpoint associated with the user-selected control object. Here, the viewpoint is defined as a policy lifecycle of an insurance policy. Moreover, the entity diagram is generated as a state diagram that graphically diagrams policy statuses as the entity nodes and transactions as interconnecting lines. In an example embodiment, the diagram content is collected by parsing the underlying OIPA rules based upon a rules engine that associates OIPA information with policy statuses and corresponding transactions.

Figure 3:
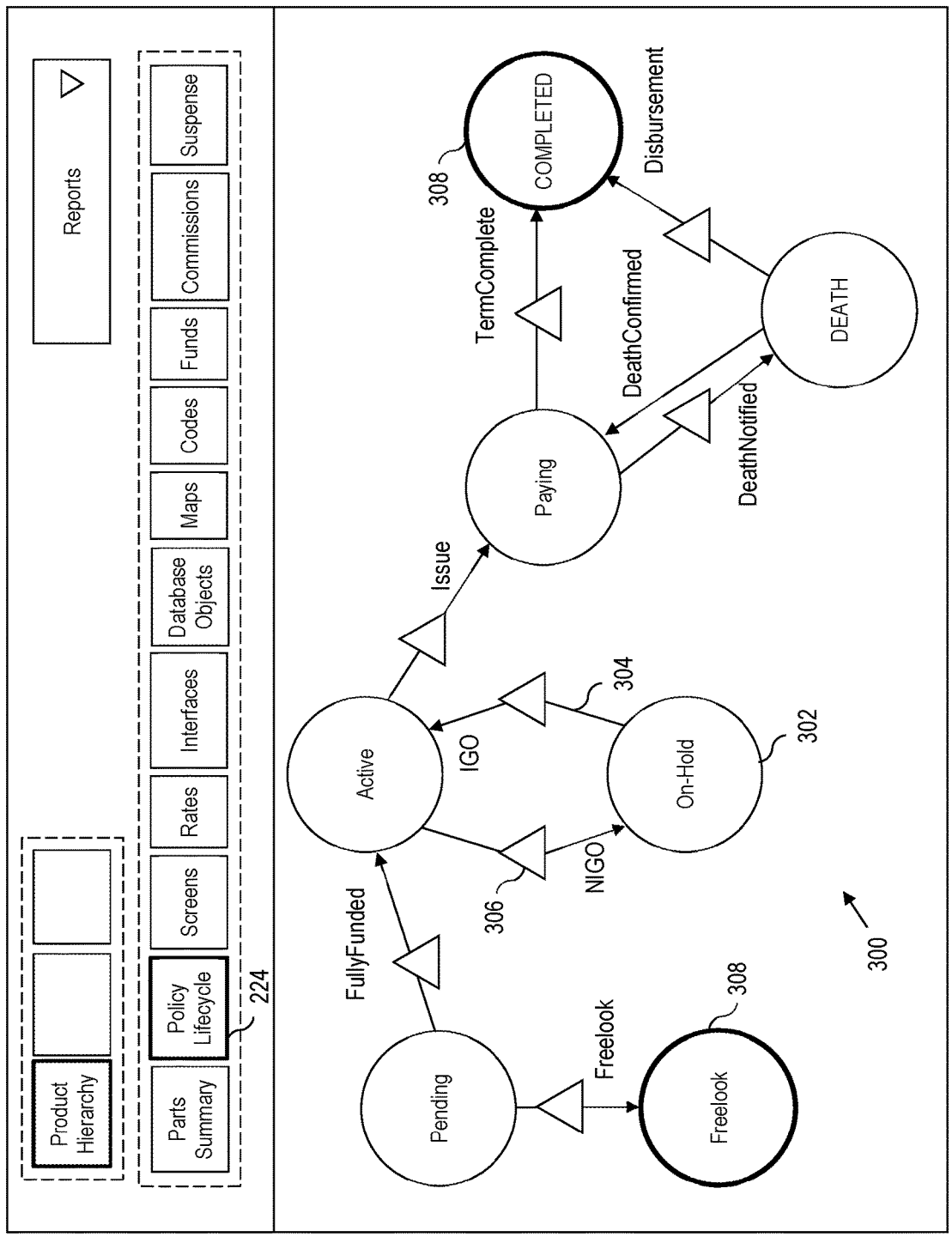
FIG. 3 illustrates an example policy lifecycle diagram presented in the diagram pane of the computer interface.

Referring to FIG. 3, in an example embodiment, the tool generates a state diagram 300 that shows policy statuses as circles 302. The tool graphically displays transactions that change or can potentially change an associated policy status from one status to another as arrows 304 connecting the respective statuses. Only those policy statuses and status changing transactions in scope are graphically presented. If a given transaction changes a policy status conditionally, the tool graphically displays a small yellow triangle 306 on the corresponding line. The end-states, where the policy cannot go out of that status, are shown as a circle with a thicker border 308 than the other statuses.

A first user input selection (e.g., single click) of a status circle triggers the tool to generate and display information in a summary pane. For instance, in an example embodiment, the tool generates information including a number of user transactions, a number of system transactions eligible in that status, and a number of policies in that status.

A second user input selection different from the first user selection (e.g., a double click) of the diagram triggers the tool to drill-down to a Transactions level (an example of which is described below). User selection of a specific status circle will limit scope of the drill-down transactions to just that status (i.e.: only those transactions eligible in that status). User selection of a blank area on the diagram will show all transactions applicable to the current scope.

A first user input selection (e.g., double click) of a triangle triggers the tool to graphically display a flowchart that depicts how the condition is evaluated (calculated). A second user input selection different from the first user selection (e.g., a single click) of a triangle can also trigger the tool to generate a display of the formula for the condition in the summary pane.

Transactions

Figure 4:
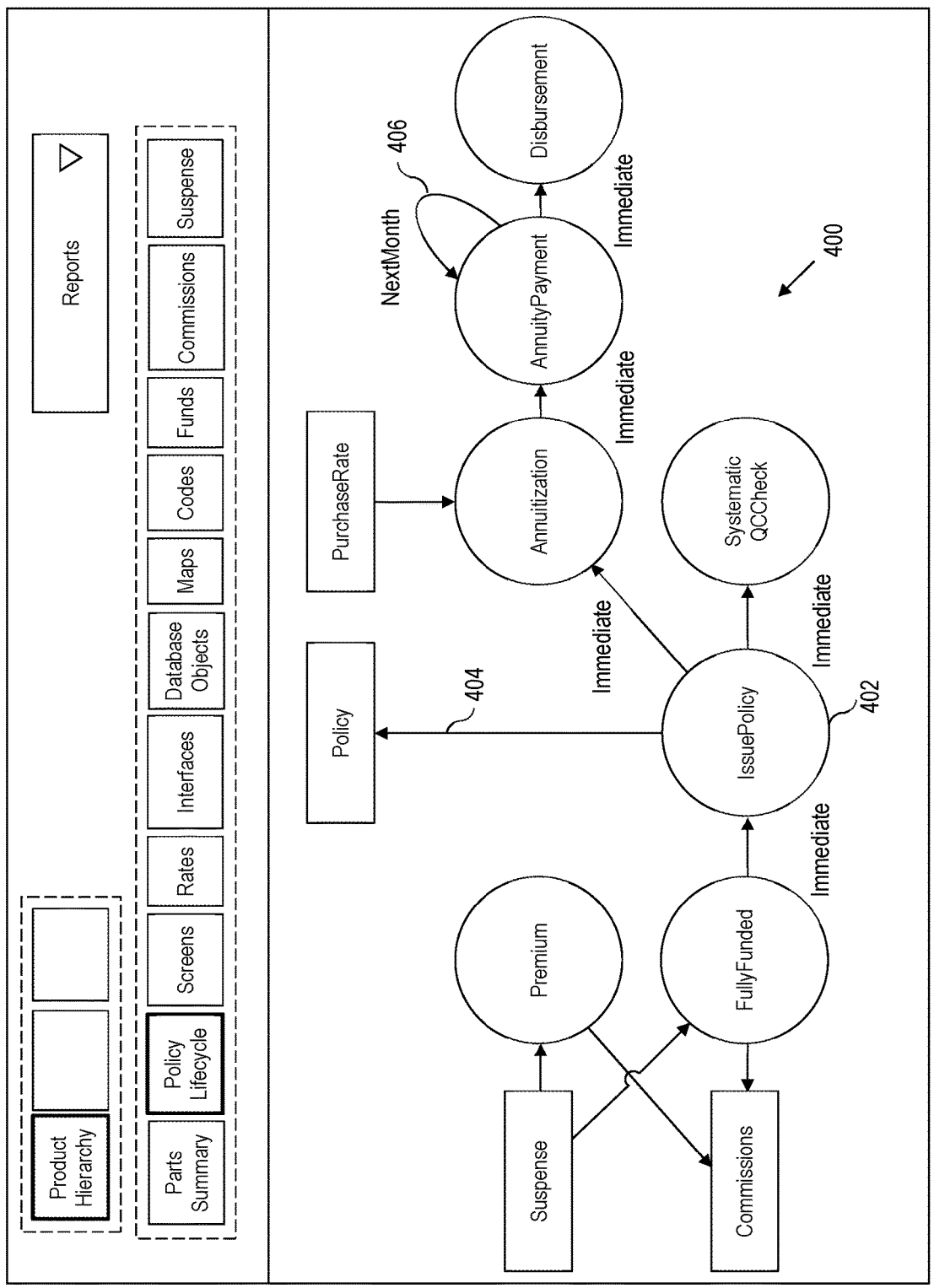
FIG. 4 illustrates an example transaction diagram presented in the diagram pane of the computer interface.

Referring to FIG. 4, in an example implementation, upon user selection of an object (e.g. circle) in the state diagram 300 (FIG. 3) triggers the tool to generate a transaction diagram 400 as a drill-down. A simplified Transaction diagram of an annuity is illustrated solely for purposes of illustration. Notably, analogous drill-downs can be generated for various features, such as a policy lifecycle, a specific status (like double-click on "Active" status circle) or a view of information pertaining to all statuses, e.g., by double-clicking in a blank area.

The transaction diagram 400 shows transactions in scope as icons 402 (circles as shown). The tool generates interconnecting lines with arrows 404 connecting icons 402 indicating which transactions update (circle to/from box arrows) which other transactions. Other visual representations can illustrate which transactions spawn (circle-to-circle arrows) other transactions. The tool graphically displays transactions that spawn themselves as a curved arrow 406 pointing to the same circle (i.e.: fishhook). The tool can also optionally graphically represent user transactions in a first designator (e.g., color, shading, shape, etc.), system transactions in a second designator different from the first designator, and the transactions that are available for user and system in a third designator different from the first and second designators. The tool generates a graphical representation of a description on the spawn line. If a spawn is conditional, the tool generates a small yellow triangle on the corresponding line.

The tool graphically renders the transaction diagram 400 to include transactions from other levels that spawn or are spawned by the above transactions (e.g., client transaction spawns a policy level transaction, or policy level transaction spawns a plan level transaction, etc.). In some embodiments, such transactions are visually distinguished with a visual cue, e.g., these transactions can be presented in a different color border.

If a spawn is conditional, the tool graphically generates a visual icon, e.g., a small yellow triangle on the line. A first user input selection (e.g., double click) of the triangle triggers the tool to drill-down to show a flowchart showing how the condition is calculated. A second user input selection different from the first user input selection (e.g., single click) of the triangle can also be used to show a formula for a condition presented in the summary pane. User selection of the spawn line triggers the tool to graphically render information about the spawn (e.g., spawn code, description, from/to fields, condition formula, etc.) on the summary pane.

The tool also causes graphical elements to be generated that represent different types of entities on the same diagram using different nodes (e.g., different color, shading, icon, etc.) to distinguish each node type. In some embodiments, a distinguishing graphical element is generated, e.g., along the perimeter of the area with the transaction circles. In an example embodiment, the tool graphically generates a node per entity for entities that can include by way of example, Policy, Client, Address, Policy Overview, Segments, Roles, Child Policy, Rates, Interfaces, Commissions, Funds, Suspense, Bills, Disbursements, Withholdings, etc.

In an example embodiment, entities that directly interact with visible transactions are shown with a visual indicator (e.g., a different color, different line weight, etc., indicate non-spawn interactions). Example entities can include, but are not limited to Transaction updates fields on the entity (Policy screen); Transaction spawns child policy; Transaction reads field(s) from the entity (a Segment screen); Transaction updates or reads role field(s); Summary screen reads activity fields corresponding to a transaction; Transactions uses extension or real-time interface (e.g., PDA, other software systems, etc.); Process File interface inserts activities; and Transaction uses list of codes in a combo-box field; Policy screen spawns a policy level transaction.

The tool renders the diagram such that arrows connect the transaction to the interacting entity with the arrow showing the direction of interaction. However, other visual representations can also be used. To keep the diagram clean, in some embodiments, multiple interactions with the same entity by same transaction are graphically illustrated as a single line. Moreover, in some embodiments, these arrows can be visually distinguished from the transaction spawn arrows, e.g., by using a different line weight, color, arrowhead configuration, etc.

In some implementations, user selection of an object in the diagram triggers the tool to update the summary pane with useful information relevant to that object (e.g., for a transaction—effective date settings, number of fields, number of math variables, number of activities, etc.). User selection of a line triggers the tool to show useful information about the interaction on the summary pane. As an example, for a spawn line the summary pane can show a spawn code and description, from/to fields, condition formula, etc. User selection of an object can also trigger the tool to drill-down to the context for that object (e.g., Transaction Context—see below).

Transaction Context

The tool causes a transaction context diagram to be displayed when a user selects a transaction from the level above. The transaction context shows the chosen transaction in the center, along with any applicable entities around the transaction with arrows connecting each to/from the transaction in the center. This view shows transactions as using an icon such as circles and other entities as nodes. Only those items that interacts with, or are used by, the center transaction are graphically presented. However, the diagram shows events, math, and variable lists in a visually distinguishable manner, e.g., select color for easy identification.

Example graphically displayed items comprise Other Transactions Spawned—e.g., a circle for each item with an expandable list of spawn fields on the line; Transactions Of Other Levels (plan level, client level, etc.)—e.g., a circle for each with an expandable list of spawn fields on the line; Fields—expandable list; Events—single node; Math—expandable list of all variables (show name, type, data type, default, etc.); Input Variables—expandable list of input variables (show name, type, etc.); Output Variables—expandable list of output variables (show name, type, etc.); Valuation—single node; Allocation—single node; NUVs—single node; Mandatory Fields—expandable list; Add-Time Validations (edits)—expandable list (message & expression); Process-Time Validations (ValidationExpressions)—expandable list (message & expression); Policy—expandable list of fields (indicate name and read/write); Client—expandable list of fields (indicate name and read/write); Address—expandable list of fields (indicate name and read/write); Policy Overview—expandable list of fields; Segments—expandable list of fields (indicate name and read/write); Roles—expandable list of fields (indicate name and read/write); Child Policy—expandable list of fields; Rates—expandable list of fields; Interfaces—expandable list of fields and variables used; Database Objects—expandable list of types of objects (or SQLs); Maps—expandable list of maps; Codes—expandable list of codes; Commissions—expandable list of variable; Funds—expandable list of funds; Suspense—single node.

User selection of an object in the diagram triggers the tool to update the summary pane with useful information relevant to that object (e.g., for a screen—a number of types, number of user enterable fields, number of hidden fields, number of math variables, number of validations, etc.).

User selection of a single Field in the expanded Fields list triggers the tool to drill-down to show a flowchart of how just that field is used in Events, ScreenMath, Actions, and Math.

User selection of an Events node triggers the tool to drill-down to show a flowchart of how Fields, Events, ScreenMath, and Actions interact.

User selection of a title of a math variable list (Math, Input Variables, Output Variables) triggers the tool to drill-down to show the flowchart for all items in the list. User selection of a single math variable in one of these lists triggers the tool to drill-down to show the flowchart of how just that variable is calculated.

User selection of the center transaction triggers the tool to drill-down to a diagrammatic specification (e.g., in XML).

Flowcharts

In an illustrative embodiment, flowcharts describe how the variable(s) in scope are calculated, step-by-step, using standard flowchart symbols. In this regard, the tool graphically displays nodes for processes (e.g., an SQL, default, function, PROCESS type, etc.). The tool also graphically displays a select symbol (e.g., diamond) for IF blocks to show TRUE and FALSE branching. The tool also graphically displays inputs (those values going in if math was a black-box) and outputs (those values coming out if math was a black-box) as nodes (e.g., rectangular box) that can have visually distinct characteristics, e.g., different color, shading, line weight, etc.). The tool can also graphically display the intermediate nodes (e.g., rectangular box) in another visually distinguishable manner, e.g., color, shading, line weight, etc.) so that intermediate nodes can be easily distinguished. In a tree form, inputs are also referred to as roots and outputs are also referred to as leaves. The tool graphically highlights any calculated but unused outputs, e.g., using color. The tool uses different notations or symbols to distinguish different variable TYPEs (SEGMENTFIELD, SQL, FIELD, POLICYFIELD, etc.).

Math Flowchart Example

Assume solely by way of illustration, that the following code represents a math operation.

<Transaction>
. . .
<Field>
  <Name>LiquidityPeriodStartDate</Name>
  <Display>LiquidityPeriodStartDate</Displaye>
  <DataType>Date</DataType>
  <Hidden>Yes</Hidden>
  <Calculated TYPE="SQL">Select SF.DateValue from AS Segment S, AsSegmentField Sf Where S.PolicyGUID='[PolicyGUID]' and Sf.FielName=LiquidityPeriodStartDate and S. SegmentGUID=SF. SegmentGUID</Calculated>
</Field>
<Math>
<MathVariables>
. . .
<MathVariable VARIABLENAME=" LiquidityPeriodStartDateMV" TYPE="SEGMENTFIELD" SEGMENTGUID="LiquidityGUID" DATATYPE="DATE">LiquidityPeriodStartDate</MathVariable>
<MathVariable VARIABLENAME=" DefaultDate" TYPE="FUNCTION" DATATYPE="DATE">ToDate ("01/01/1800")</MathVariable>
<MathVariable VARIABLENAME=" LiquidityPeriodStartDaysMV" TYPE="FUNCTION" DATATYPE="INTEGER">DaysDiffOf(DefaultDate, LiquidityPeriodStartDateMV)</MathVariable>
<MathVariable VARIABLENAME=" WithdrawalDateMV" TYPE="FIELD" DATATYPE="DATE">Activity:EffectiveDate</MathVariable>
<MathVariable VARIABLENAME=" BusinessEffectiveDays" TYPE="FUNCTION" DATATYPE="INTEGER">DaysDiffOf(DefaultDate, WithdrawalDateMV)</MathVariable>
<MathIF="BusinessEffectiveDays > =LiquidityPeriodStartDaysMV">
  <MathVariable VARIABLENAME="LiquidityPeriodFlag" TYPE="VALUE: DATATYPE="TEXT">Yes</MathVariable>
. . .
</MathVaribles>
. . .
</Math>
. . .
</Transaction>

Figure 5:
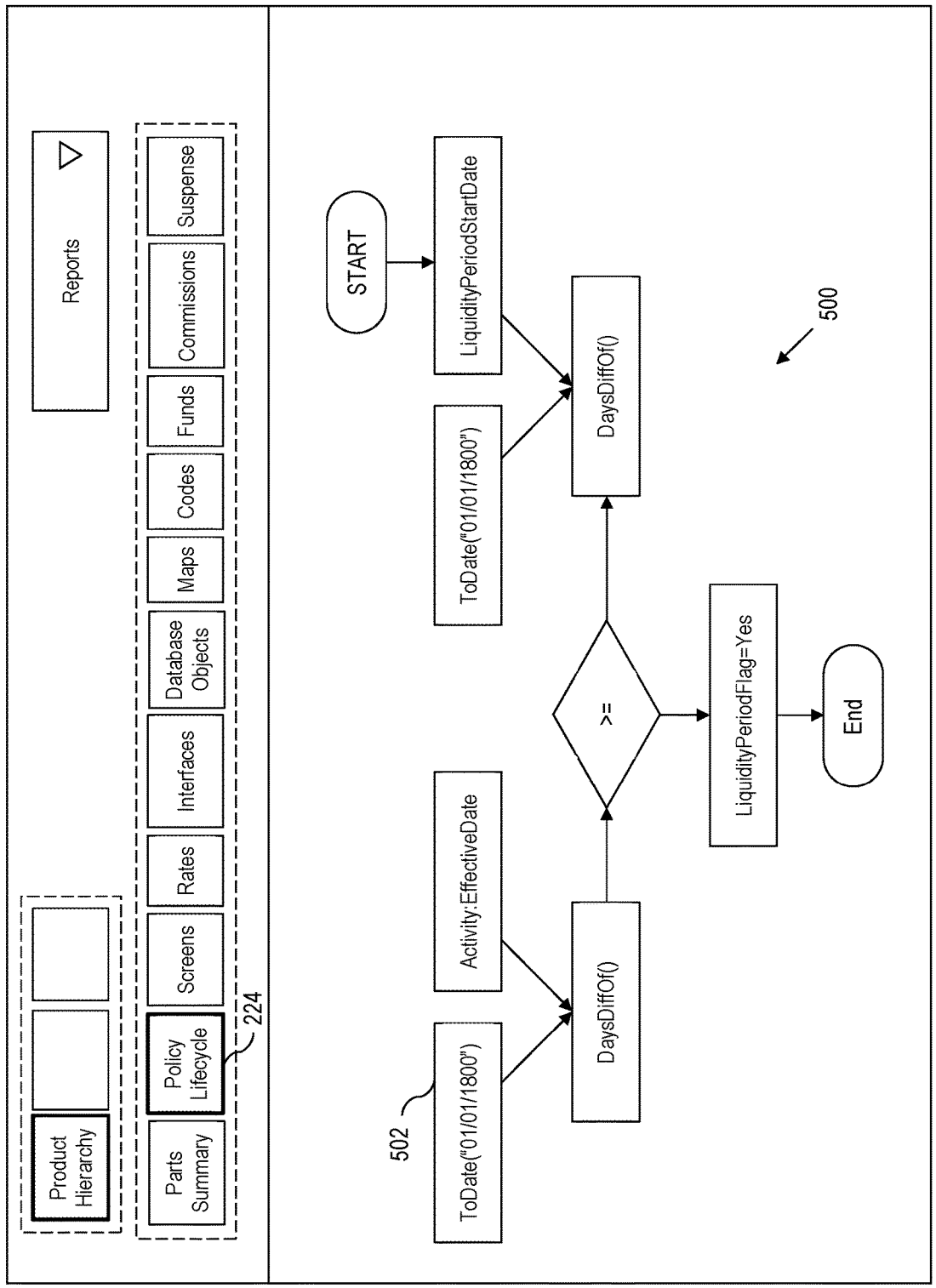
FIG. 5 illustrates an example flow of a specific transaction selected from the transaction diagram of FIG. 4.

Referring to FIG. 5, in an example implementation, the math code illustrated above is converted to a flowchart 500. In general, this is a second drill-down level into a specific transaction in FIG. 4 (ex: Premium transaction circle). In an example embodiment, FIG. 5 shows the flowchart of any math performed by that transaction, so as to help to answer the question "what all does a Premium transaction calculate in this product, and how?". As such, in the example, the diagram shows part of such a flowchart as an example. Some flowcharts may be simple and others may be complex.

On the Events flowcharts, ONLOAD, ONSUBMIT, and ONCHANGE events can be visually distinguished, e.g., using different color, etc. Events flowchart show interactions among Fields, Events, ScreenMath, and Actions in a single diagram.

Where possible, the tool graphically displays different database objects involved in SQL type variables as separate nodes 502 with their respective names (e.g., tables, views, stored procedures, UDFs, etc.). The tool includes a software module that parses and analyzes a given SQL statement for conversion to nodes for display in various diagrams as described herein. As such, this module can be used in multiple diagrams that involve database objects.

User selection of an object on the flowchart triggers the tool to graphically display relevant details in the summary pane (e.g., type, datatype, expression, SQL statement, etc.). User selection can trigger the tool to drill-down to show greater detail where applicable.

Screens Diagram

Figure 6:
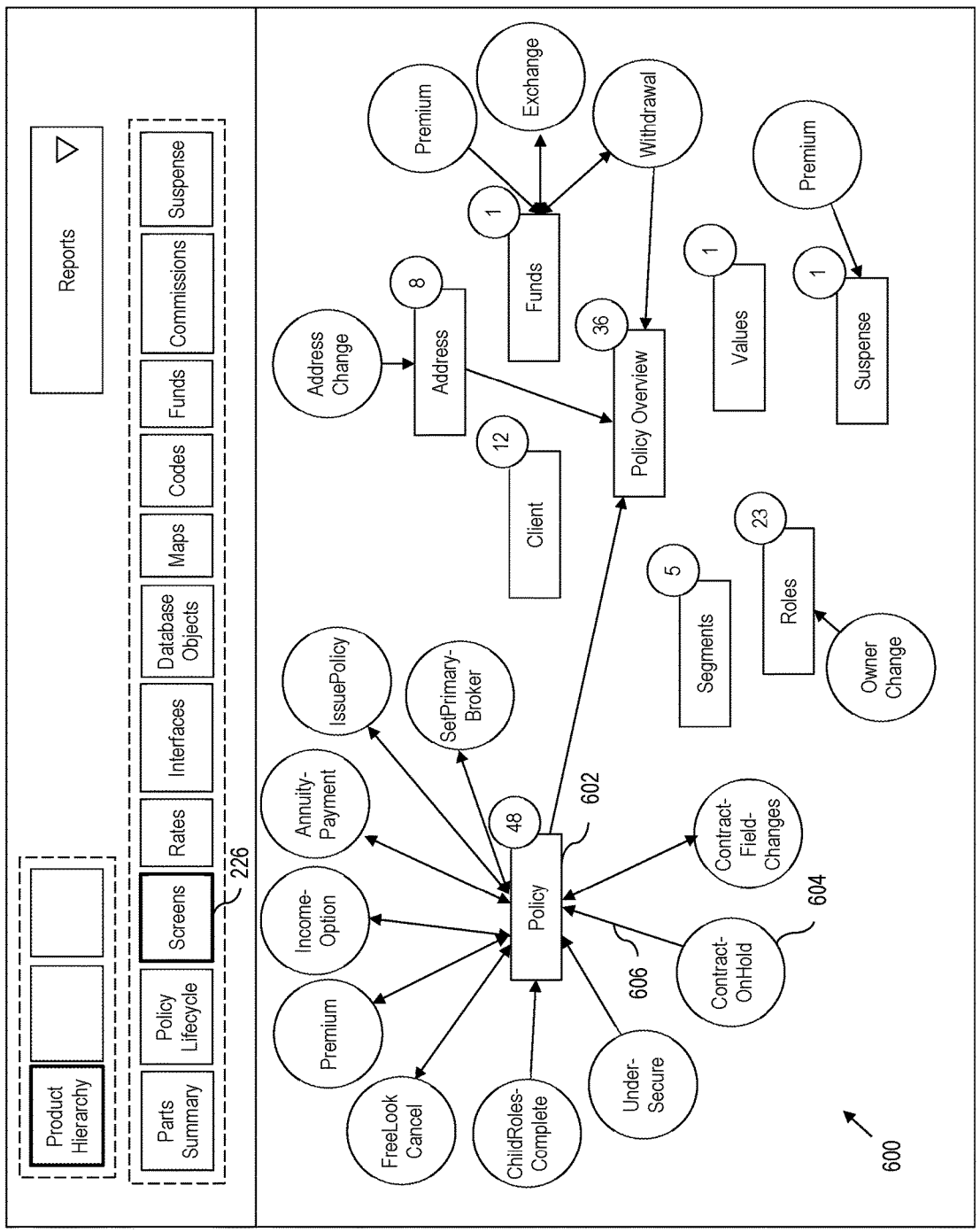
FIG. 6 illustrates an example screen and transaction diagram presented in the diagram pane of the computer interface, e.g., which can be used for a product to visualize how screen rules interact with objects described by other rules.

Referring to FIG. 6, in an example implementation, selecting the screens object 226 in the level two control objects 210 triggers the tool to display a screens diagram 600. The diagram shows an example arrangement of screens and transactions for a hypothetical annuity product.

The diagram is generated by decomposing the associated digital product into an entity diagram of entity nodes connected by lines, where the entity nodes are defined based upon the viewpoint associated with the user-selected control object. Here, the viewpoint is defined as a screens context. Moreover, the generated entity diagram includes screens within a current scope as nodes, transactions within the current scope as nodes, and lines that interconnect screen nodes and transaction nodes that represent a direction of interaction. In an example embodiment, the diagram content is collected by parsing the underlying OIPA rules based upon a rules engine that associates OIPA information with screen and transaction information.

Transactions often stamp certain key values on screens to preserve information (often in hidden fields) for later consumption by other transactions during the lifecycle of a policy (via CopyTo<Screen>attached rules). Transactions also consume these values during policy lifecycle (via SQLs, <Screen>Field type variables, or <Screen>: notation). The illustrated example diagram shows these interactions between the transactions and the screens. It also provides a starting point for drilling into more details related to the screens.

In an example embodiment, the tool graphically displays all configured screens applicable to the current scope as nodes 602 in the middle of a display area, (e.g., using a predetermined color or other visual element). The tool graphically displays transactions 604 that the configured screens interact with are graphically represented in another visually distinguishing manner, e.g., as darker blue circles along the perimeter. The tool connects the transactions to the screens with arrows 606 showing the direction of interaction. The list also indicates the counts to be shown on yellow stats circles overlapping the top right corner of the screen nodes. Example screens include, but are not limited to Policy—Policy Statuses; Policy Overview—Number of visible fields; Client—Client Types; Address—Address Roles; Roles—Role Codes; Segments—Segment Names; Funds—Fund Types; Values—Money Types; Suspense—Suspense Types; etc.

User selection of a screen triggers the tool to update the summary pane with useful information relevant to that object (e.g., for Policy screen—number of enabled fields, number of disabled fields, number of hidden fields, number of policies, etc.).

User selection of an object triggers the tool to drill-down to the next level for that screen (see Screen Context herein).

Screen Context

Figure 7:
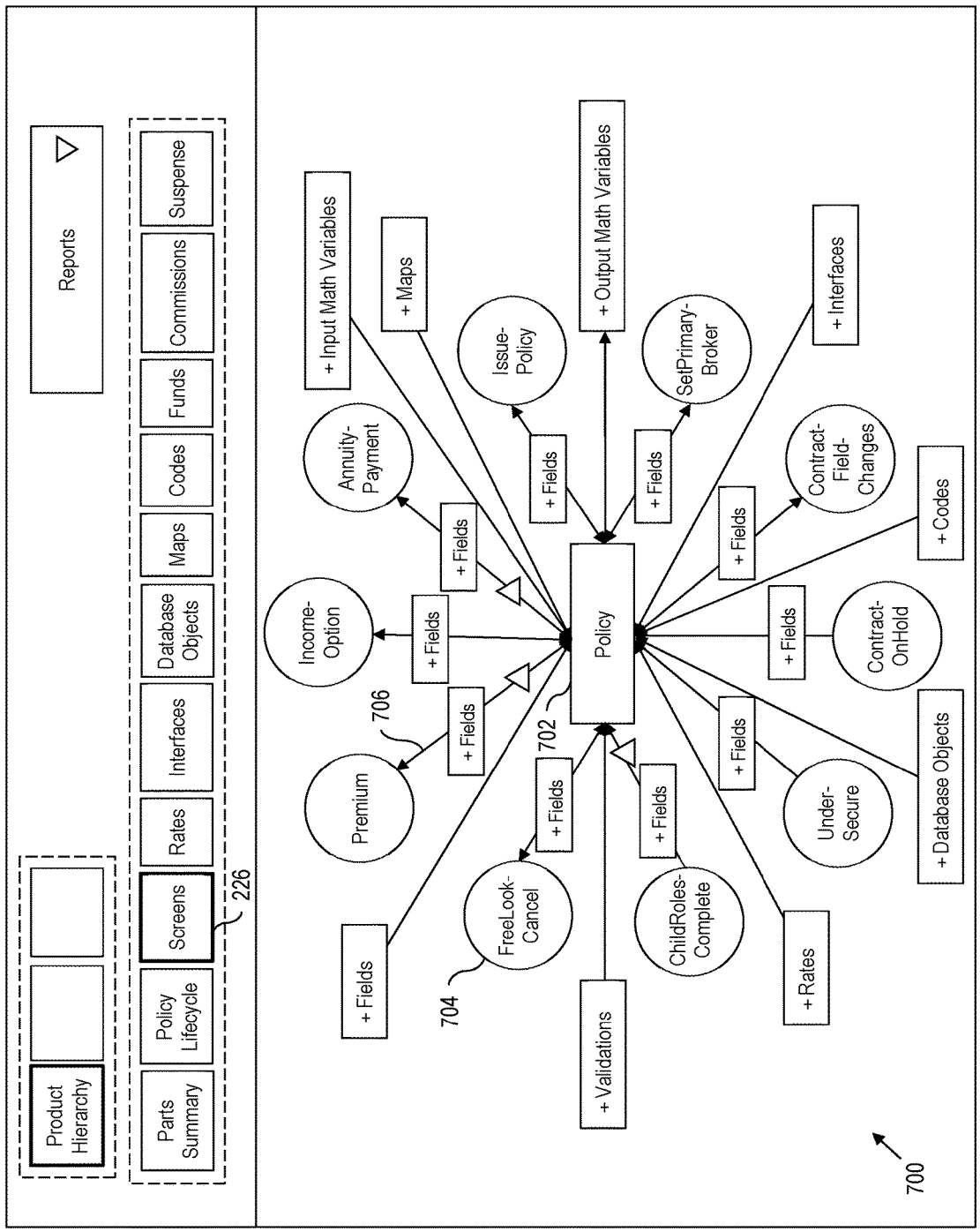
FIG. 7 illustrates an example drill-down of a specific screen rule presented in the diagram pane of the computer interface.

Referring to FIG. 7, in an example implementation, the tool graphically displays a diagram 700 that shows the chosen screen in the middle as a node 702 (e.g., rectangle box in a predetermined color). If the chosen type of screen has multiple types (e.g., roles), the tool graphically displays each type as a separate node.

The tool graphically displays any transactions 704 that read or write to screen fields around the perimeter. Moreover, the tool graphically connects the transactions with the respective screen objects with direction arrows 706. Also, the tool graphically displays expandable Field boxes on the lines to show the From/To fields for each interaction. The tool graphically displays a graphic element, e.g., yellow triangle on the line, for conditional information. User selection of the element, e.g., triangle triggers the tool to graphically display a flow chart of the condition.

In addition, the tool graphically displays expandable boxes to indicate applicable items from the list below. When expanded, names and other attributes (e.g., enabled/disabled, visible, type, etc.) are displayed, such as Fields—all screen fields (Enabled=green, disabled=black, hidden=gray); Input Math Variables—inputs in to the screen when is math viewed as a black-box; Output Math Variables—outputs from the screen when math is viewed as a black-box; Interfaces—interfaces that interacts with the screen (e.g., AsFile inserts Policies, PDA, etc); Maps—any AsMaps accessed by the screen; Codes—any AsCodes used (code names); Database Objects—any views, functions, etc. accessed by the screen; Rates—any rates used by the screen (different types of Rate Groups); and Validations—all validations (required fields, warnings, and errors, etc.) including the message and the condition expression/

User selection of a variable or a validation triggers the tool to graphically display the flowchart.

User selection of an object in the diagram triggers the tool to update the summary pane with useful information relevant to that object.

Moreover, user selection of the object can trigger the tool to drill-down to the diagrammatic spec for that object.

Rates Diagram

Figure 8:
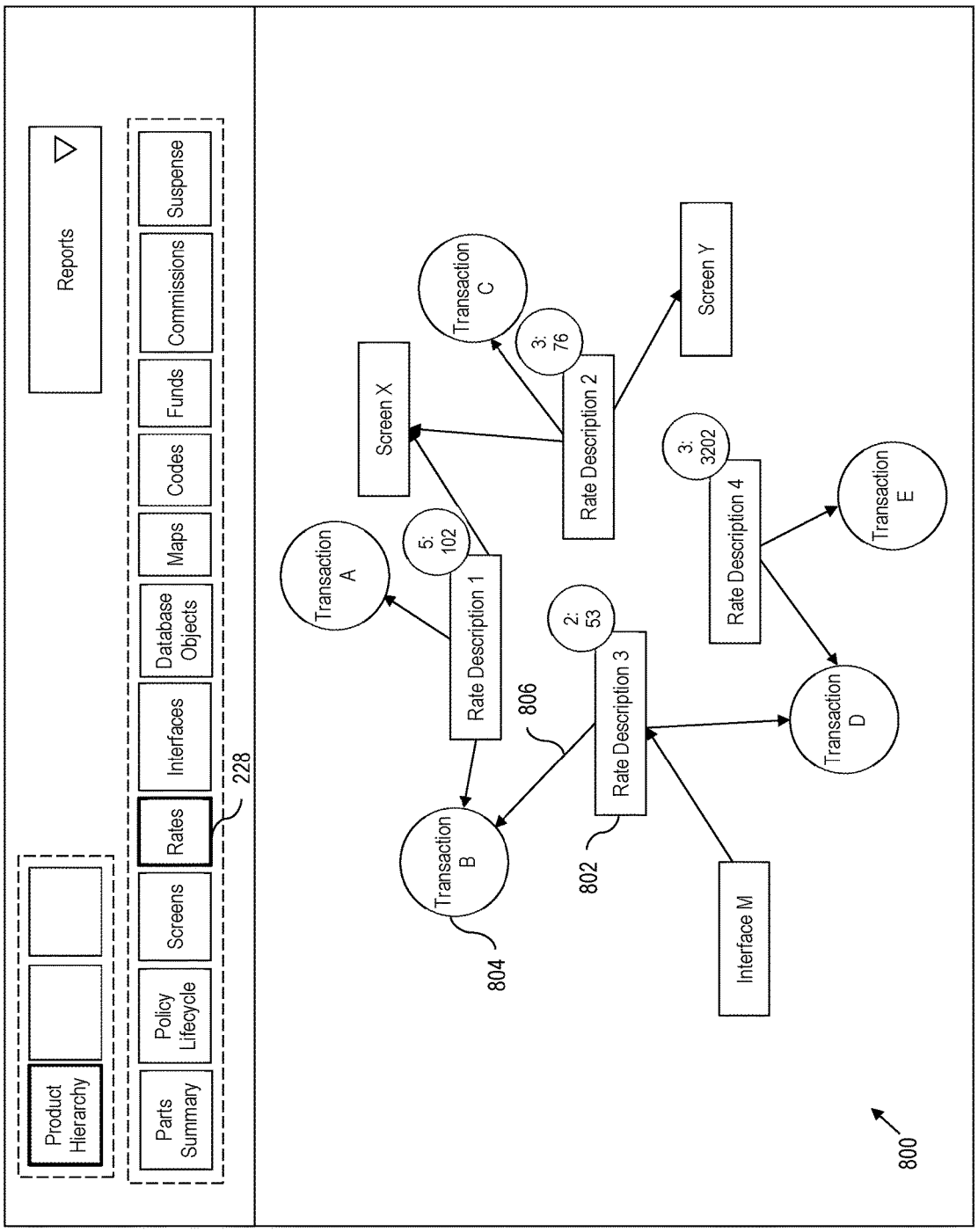
FIG. 8 illustrates an example rates diagram presented in the diagram pane of the computer interface.

Referring to FIG. 8, in an example implementation, user selection of the Rates object 228 in the second row (i.e., level two) of objects 210 of the control pane 202 triggers the tool to generate a rates diagram that displays the individual Rate Groups (Rate Descriptions) that are applicable to the current scope as nodes 802 in the middle, and other objects 804 that use those rates along the perimeter.

The diagram is generated by decomposing the associated digital product into an entity diagram of entity nodes connected by lines, where the entity nodes are defined based upon the viewpoint associated with the user-selected control object. Here, the viewpoint is defined as a rates context. Moreover, the generated entity diagram includes at least one rate group applicable to a current scope as nodes, transactions within the current scope as nodes, and lines that interconnect rate group nodes and transaction nodes that represent a direction of interaction. In an example embodiment, the diagram content is collected by parsing the underlying OIPA rules based upon a rules engine that associates OIPA information with rate group and transaction information.

For instance, in an example implementation, the tool graphically displays interconnecting lines 806 that connect the objects to the rate nodes using arrows that show the direction of interaction. The tool also generates a graphical element, e.g., a yellow stats circle over the top right corner of each rate node, to show the number of criteria columns (Date Criteria, Integer Criteria, Criteria 1, etc.) and the number of active rates, in this format: <number Criteria Columns>:<number Active Rates>.

User selection of an item in the table triggers the tool to update the summary pane with useful information relevant to that object. Moreover, user selection of a rate triggers the tool to drill-down to the Rate Context level for that item.

Rate Context

Figure 9:
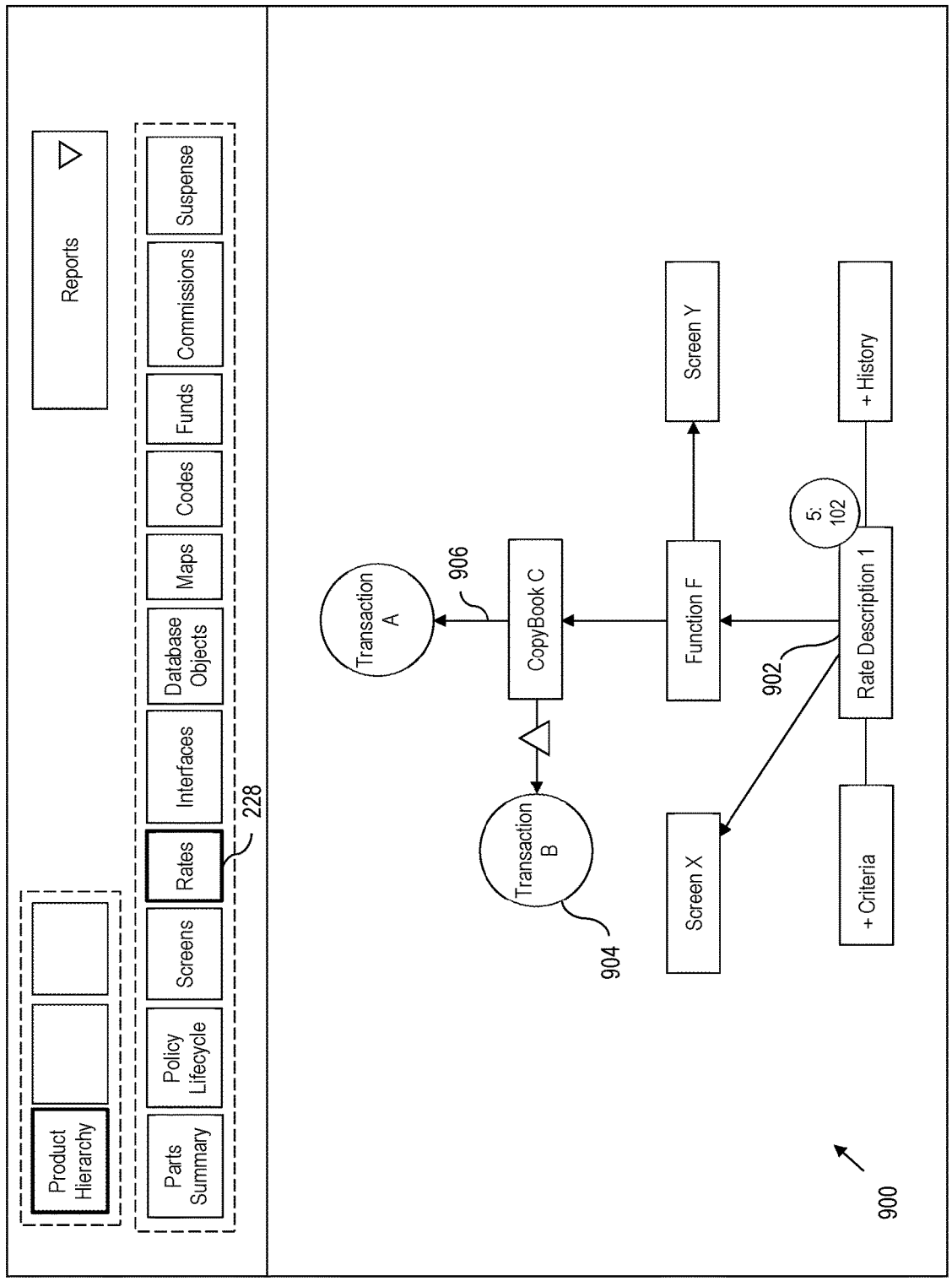
FIG. 9 illustrates an example drill-down of the rates diagram of FIG. 8.

Referring to FIG. 9, in an example implementation, a rate context diagram 900 focuses on the chosen Rate Description as a node 902 in the bottom center of the display screen. The tool causes the rate context diagram 900 to display all other objects 904 from the list below that interacts with (uses or inserts) the chosen type of rates: e.g., Criteria—Expandable list of criteria columns that the rate varies by, each showing the number of unique values in the 2nd column; History—Expandable list of start/end dates in descending order of start date; Transactions that access the rate; functions that access rates; CopyBooks that access the rates; and Screens that access the rates; Interfaces that insert or access the rates.

The tool graphically connects the objects with arrows 906 showing the direction of the interaction (where applicable). If the interaction is conditional, the tool generates a graphical indicator (e.g., a small yellow triangle on the line). In practical applications, all objects respond to user interactions as described previously.

User selection of an item in the table triggers the tool to update the summary pane with useful information relevant to that object. Moreover, user selection of the rate triggers the tool to drill-down to the next level (see below).

Interfaces Diagram

Figure 10:
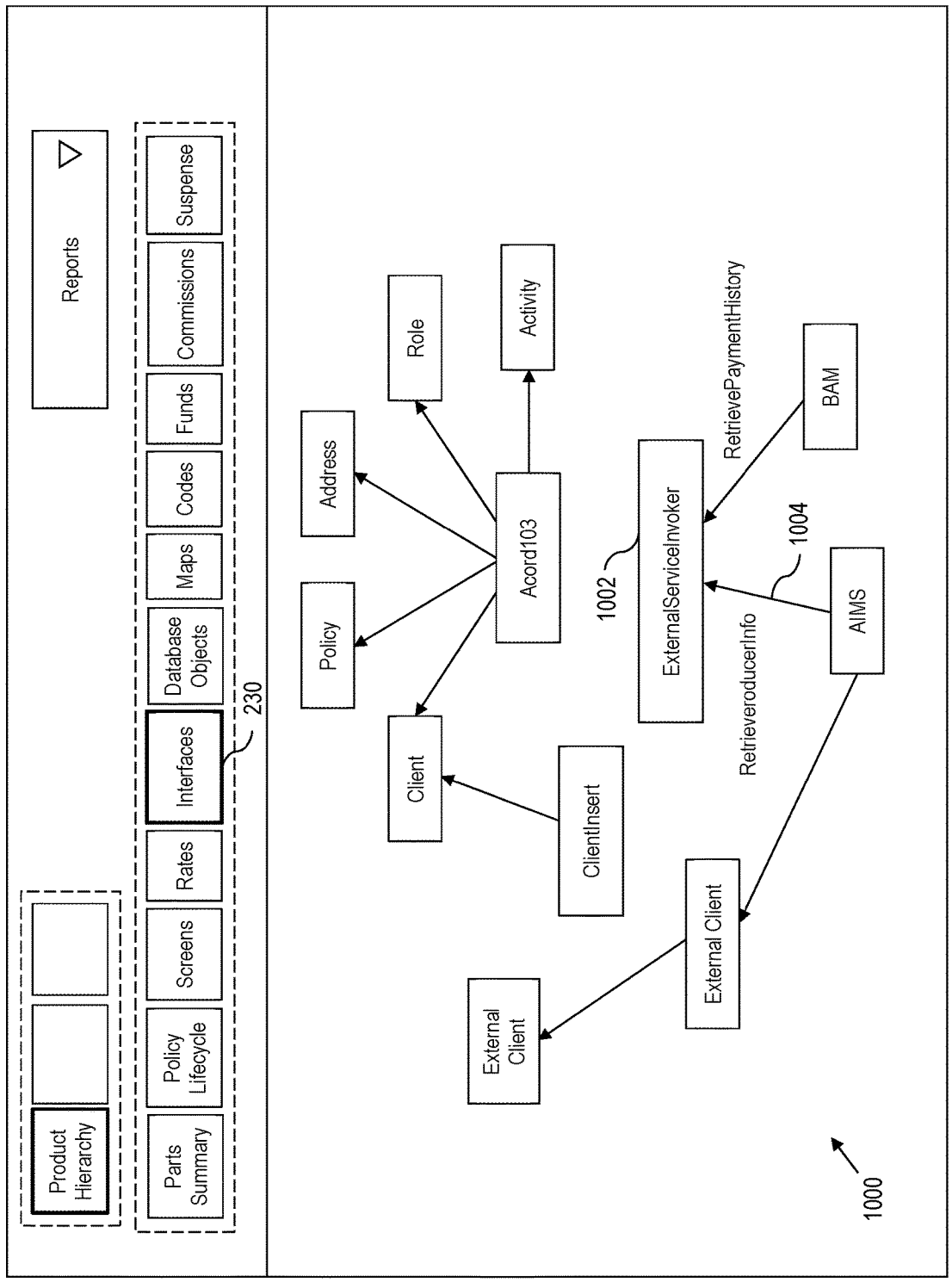
FIG. 10 illustrates an example interfaces diagram presented in the diagram pane of the computer interface.

Referring to FIG. 10, upon a user selecting the interfaces object 230 in the level two control objects 210 of the control pane 202, the tool displays an interface diagram graphically displaying all interfaces applicable to the configuration for the item chosen in level one. The diagram is generated by decomposing the associated digital product into an entity diagram of entity nodes connected by lines, where the entity nodes are defined based upon the viewpoint associated with the user-selected control object. Here, the viewpoint is defined as an interface context. Moreover, the generated entity diagram includes at least one interface applicable to a current scope as nodes, and lines that interconnect interfaces. In an example embodiment, the interface content is collected by parsing the underlying OIPA rules based upon a rules engine that associates OIPA information with interface information.

In an example implementation, the tool graphically displays each different interface as a node 1002 (e.g., using a different color for each different type of interface.) For extension-based interfaces, the tool provides a way to identify the description on the line 1004 connecting the interface to the external system, and the name of the external system, via property file configuration. Below are some potential designs for this configuration:

For Description on the line: <LineDescription SOURCE="Parameter">RetrievePaymentHistoryMap</LineDescription>

For External System: <External System SOURCE="Parameter">EndpointName</External System>

Similarly, the tool can add any additional property file configuration necessary to facilitate identifying the sources and targets for every interface from the configured rules. In some embodiments, each interface shows one or more sources and targets.

User selection of an object in the diagram triggers the tool to update the summary pane with useful information relevant to that object (e.g., URL, extension type, extension name, FileID, Object Name, etc.).

User selection of the object triggers the tool to drill-down to the Interface Context level for the chosen interface.

Interface Context

Figure 11:
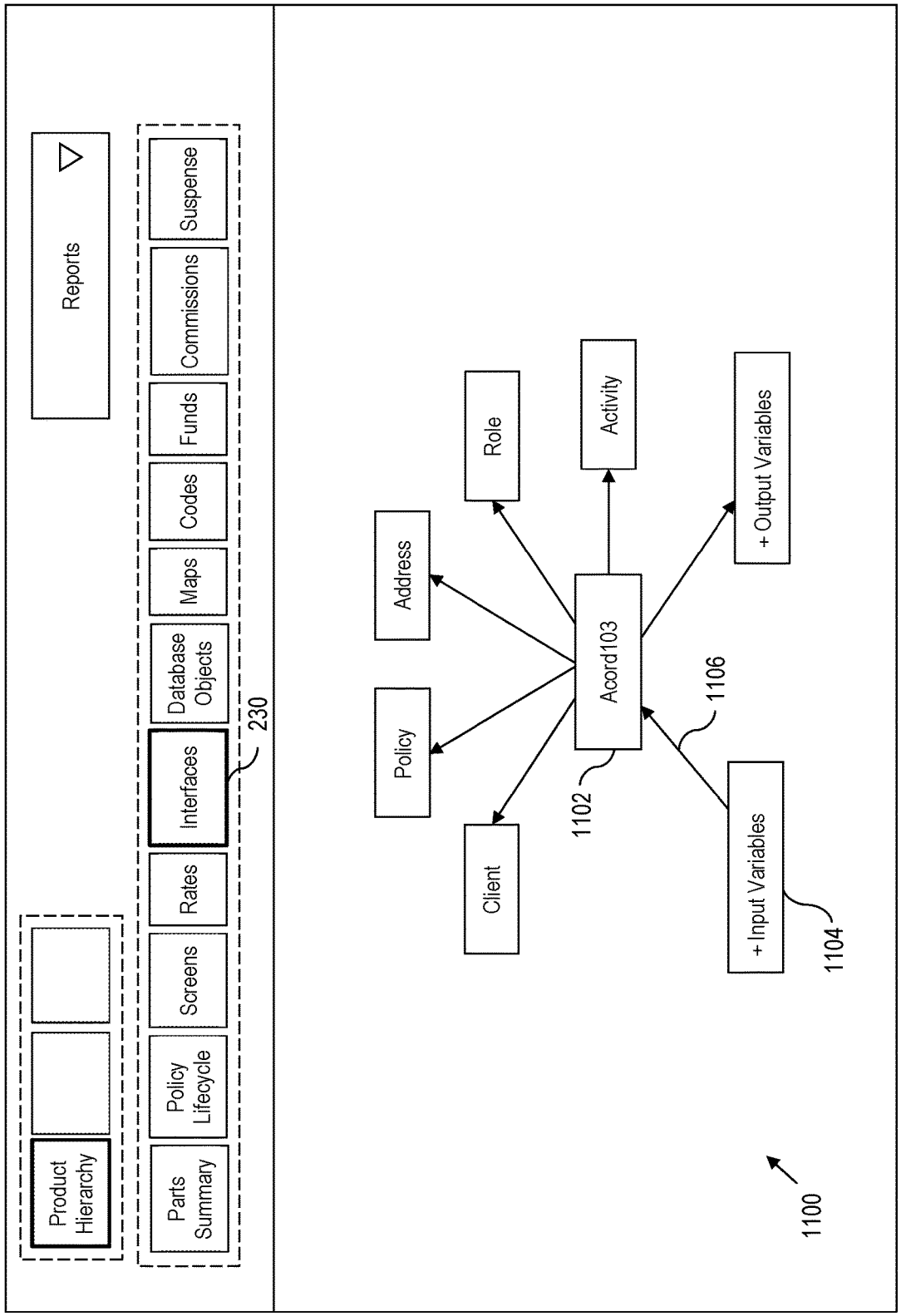
FIG. 11 illustrates an example drill-down of the interfaces diagram of FIG. 10.

Referring to FIG. 11, in an example implementation, the tool generates a diagram 1100 that is focused on the chosen interface and shows that object 1102 in the middle. The tool displays any other items 1104 that interacts with this interface, from the list below: Transactions that invoke, or activities inserted by, the interface such as graphically displaying blue circles; Objects inserted by the interface (Policy, Client, Address, Role, etc.); Screens that invoke the interface; Expandable list of input variables when interface math is viewed as a black-box, including XPaths; Expandable list of output variables when interface math is viewed as a black-box; Input XML derived from the referenced) (Paths for Process File interfaces; etc.

The tool connects the objects with arrows 1106 showing the direction of the interaction. All objects can respond to user input, e.g., via single/double-clicks as described more fully herein.

Database Objects Diagram

Figure 12:
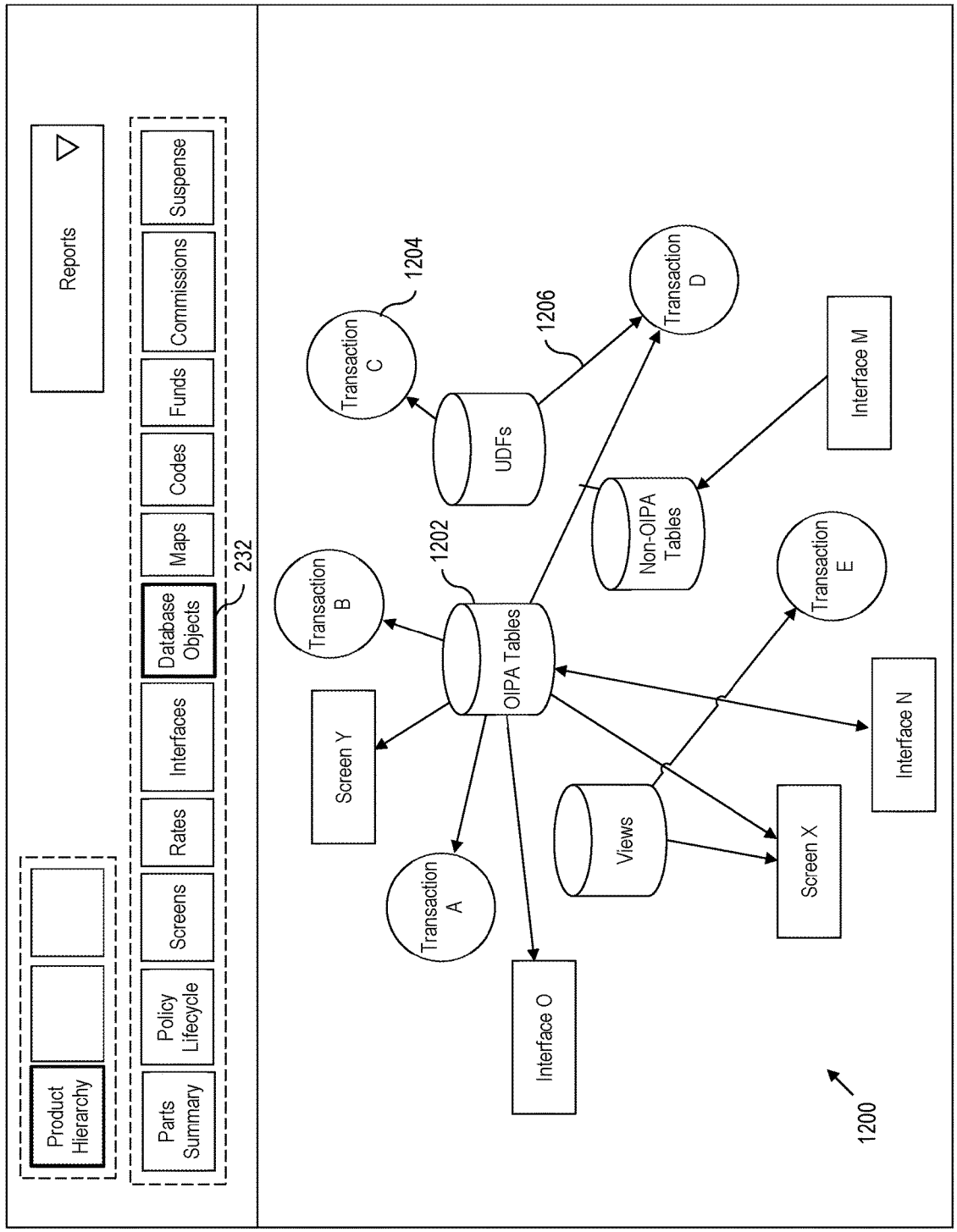
FIG. 12 illustrates an example database objects diagram presented in the diagram pane of the computer interface.

Referring to FIG. 12, in an example implementation, upon a user selecting the database objects object 232 in the level two control objects 210 of the control pane 202, the tool graphically displays a diagram 1200 that illustrates direct access of database objects (see list below for types of objects) from any configuration that is applicable to the current scope.

The diagram is generated by decomposing the associated digital product into an entity diagram of entity nodes connected by lines, where the entity nodes are defined based upon the viewpoint associated with the user-selected control object. Here, the viewpoint is defined as a database context. Moreover, the generated entity diagram includes database objects applicable to a current scope as nodes, transactions as nodes, configured objects that access a corresponding database object as nodes, and lines that interconnect database objects, transactions, and configured objects. In an example embodiment, the interface content is collected by parsing the underlying OIPA rules based upon a rules engine that associates OIPA information with database, transactions, configured object information, etc., as required by the associated diagram.

In an example configuration, the diagram 1200 displays database objects, transactions, and configured objects that access a corresponding database object that are applicable to a current scope as nodes. Moreover, the diagram includes lines that interconnect database objects, transactions, and configured objects.

These configurations may include math variables, activity fields, screen fields, interfaces, attached rules, etc. The tool graphically displays a single standard database symbol 1202 (e.g., vertical cylinder) in light blue in the middle for each type of database object in the list. The tool also graphically displays any configured objects 1204 that access the database as nodes around it and connect using arrows 1206 that show the direction of access. The direction is usually limited from the database object to the configured object, except for certain interfaces (e.g., Process File) that inserts from the object into the database. The tool uses circles to identify transactions, and different colors to identify different types of configured objects.

In an example implementation the tool processes Views or Materialized Views—these are typically found in the FROM clause, and does not have the "AS" prefix; UDFs (user-defined functions)—these are typically found in the SELECT clause, and does not have the "AS" prefix; Stored-Procedures—these are typically configured in place of an SQL, without a SELECT statement; Non-OIPA tables (those without the "AS" prefix)—these are typically found in the FROM clause, and does not have the "AS" prefix; OIPA tables (those with "AS" prefix)—these are typically found in the FROM clause, and have the "AS" prefix.

User selection of an object in the diagram triggers the tool to update the summary pane with useful information relevant to that object (number of that type of items, etc.). Moreover, user selection of an object in the diagram can also trigger the tool to drill-down to the Database Context for that object (see below).

Database Context

Figure 13:
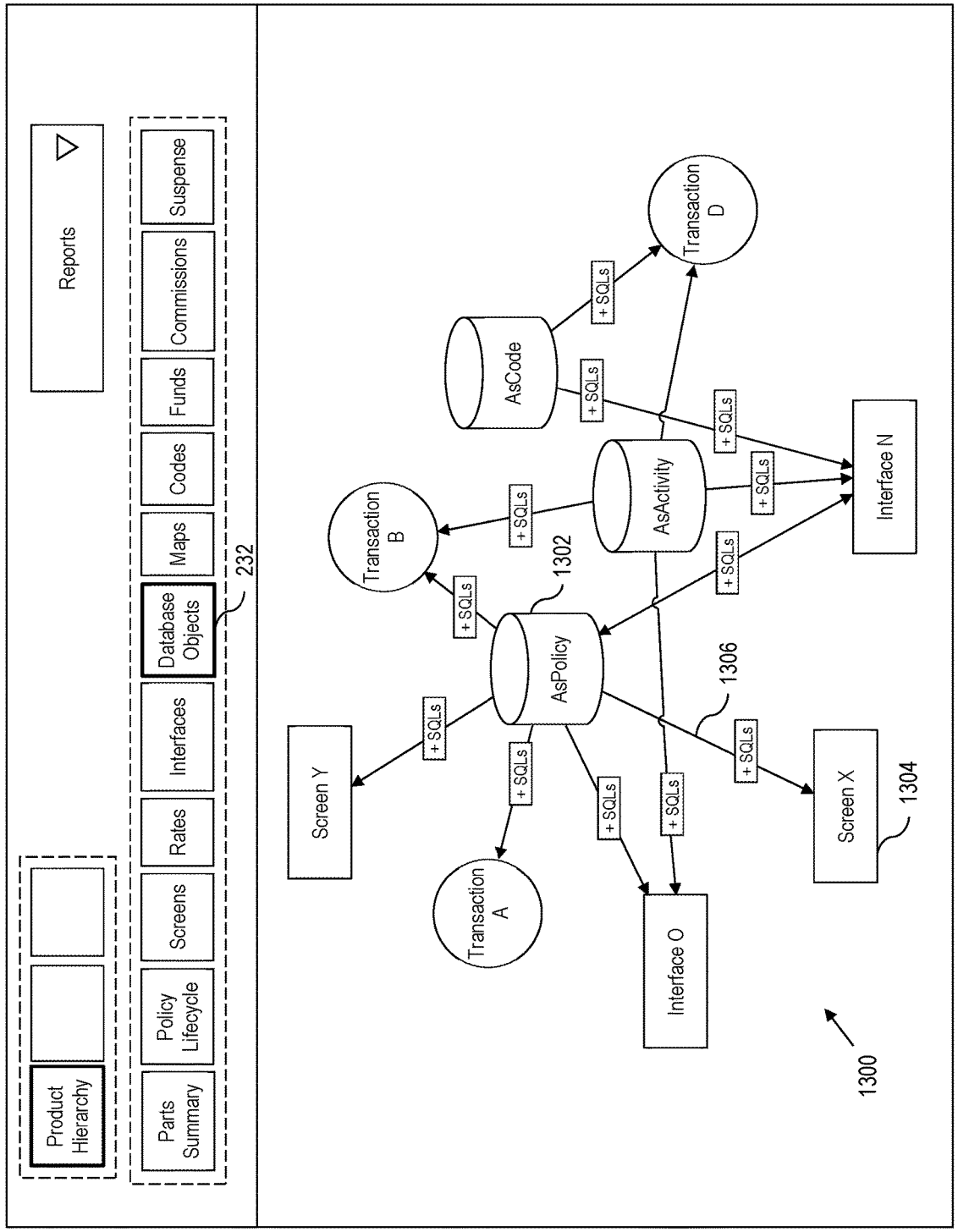
FIG. 13 illustrates a drill-down of the database objects diagram of FIG. 12.

Referring to FIG. 13, in an example implementation, a sample Database Context diagram 1300 is illustrated that could be displayed had the OIPA Tables object been selected on the higher level.

An example diagram focuses on the chosen object 1302 from the level above. If a database object 1304 (e.g., UDFs) was chosen, the diagram will show the individual UDFs in scope in the middle, each identified by its name, surrounded by all configuration objects that use them. If a configured object was chosen, the diagram will show that object in the middle surrounded by all database objects that interacts with it. Arrows indicate the direction of interactions.

In addition, the diagram illustrates an expandable list of the following items involved in the interaction on each arrow 1306: The configuration object's variables or fields (sorted)—as a list in a first column; The SQL statement or the database command—as a list in a second column.

Maps Diagram

Figure 14:
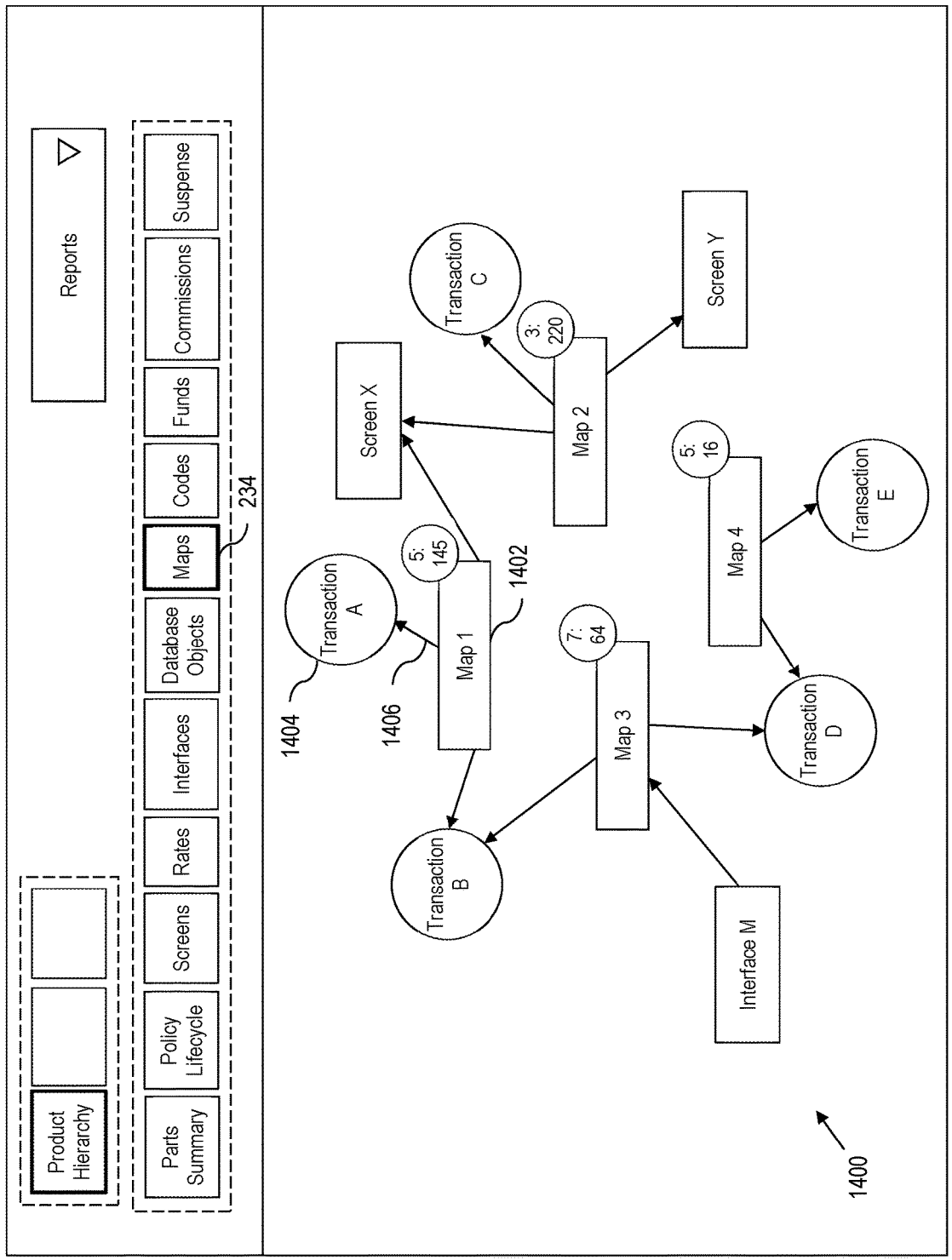
FIG. 14 illustrates an example maps diagram presented in the diagram pane of the computer interface.

Referring to FIG. 14, upon a user selecting the maps object 234 in the level two control objects 210 of the control pane 202, the tool graphically displays a maps diagram 1400 that shows the individual maps (from AsMap tables) that are applicable to the current scope as nodes 1402 in the middle, and other objects 1404 that use those maps along the perimeter.

The diagram is generated by decomposing the associated digital product into an entity diagram of entity nodes connected by lines, where the entity nodes are defined based upon the viewpoint associated with the user-selected control object. Here, the viewpoint is defined as a maps context. Moreover, the generated entity diagram includes maps within a current scope as nodes, transactions within the current scope as nodes, configured objects that access a corresponding one of the maps as nodes, and lines that interconnect maps, transactions, and configured objects. In an example embodiment, the interface content is collected by parsing the underlying OIPA rules based upon a rules engine that associates OIPA information with maps, transactions, and configured object information, etc., as required by the associated diagram.

For instance, in the example illustrated, lines 1406 connect the objects to the map nodes using arrows that show the direction of interaction. A yellow stats circle over the top right corner of each map node will show the number of entries in the map in this format: <number of criteria>: <number of map entries>.

User selection of an item in the table triggers the tool to update the summary pane with useful information relevant to that object. Moreover, user selection of a map triggers the tool to drill-down to the Map Context level for that item (see below).

Map Context

Figure 15:
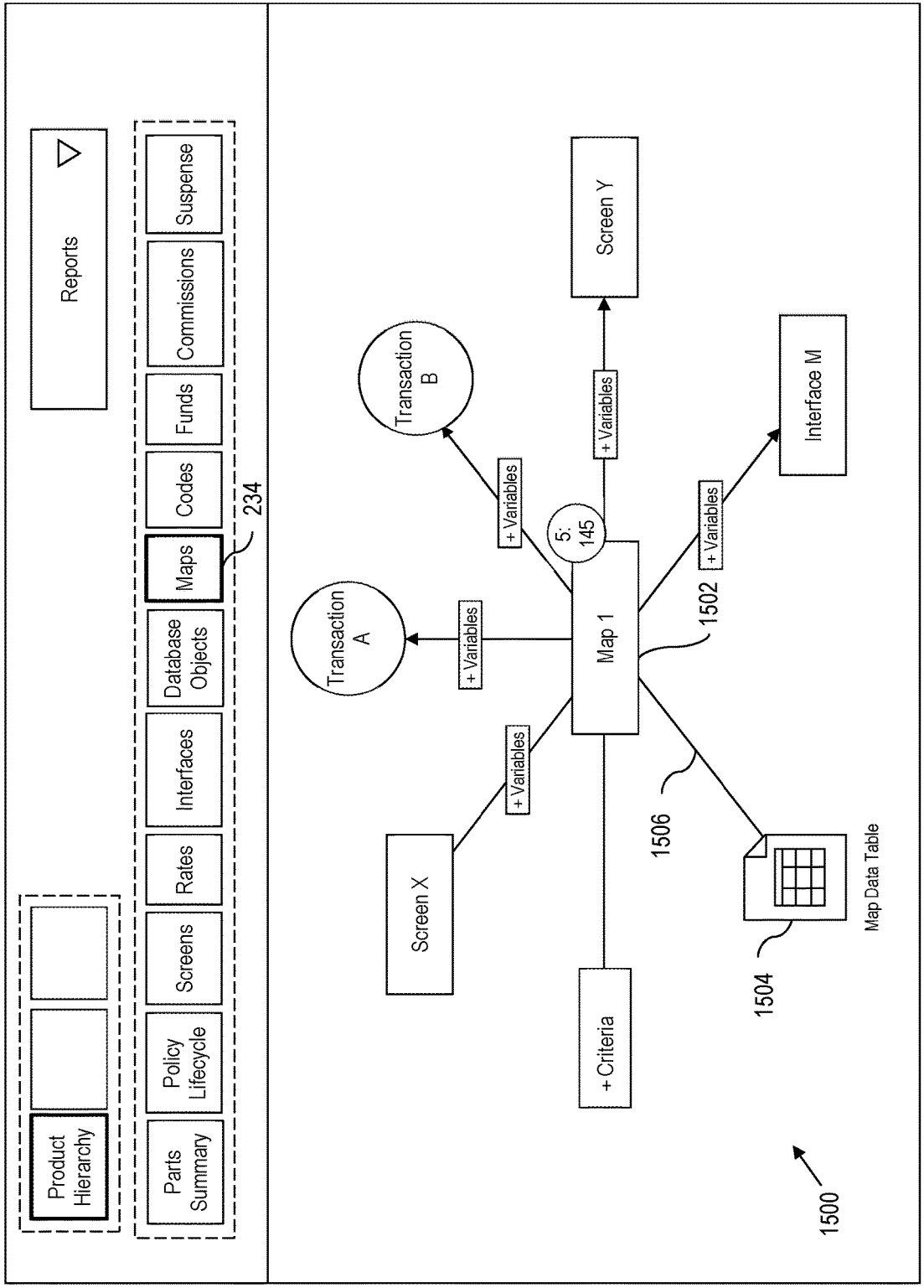
FIG. 15 is an example drill-down of the maps diagram of FIG. 14.

Referring to FIG. 15, in an example implementation, a diagram 1500 focuses on the chosen map as a node 1502 (e.g., having a specified color such as blue) in the center. The diagram 1500 can also show all other objects 1504 from the list below that interacts with the chosen map. Criteria is an expandable list of criteria columns that the map varies by, each showing the number of unique values in a column. Transactions can access the map with expandable list of directly impacted variables on the line. Functions can access the map with expandable list of directly impacted variables on the line. The tool graphically connects any transactions or screens that use the functions with lines having arrows to shows direction. CopyBooks can access the map with expandable list of directly impacted variables on the line. The tool also graphically displays any transactions or screens that use the copybook and connect with arrows to show direction. Screens access the map directly with an expandable list of directly impacted variables. Interfaces can insert or access the map with an expandable list of directly impacted variables.

The tool connects maps with arrows 1506 showing the direction of the interaction (where applicable). If the interaction is conditional, the tool graphically displays a small yellow triangle on the line. All objects respond to user selection, e.g., single/double-clicks as described previously.

User selection of an item in the table triggers the tool to update the summary pane with useful information relevant to that object.

Codes Diagram

Figure 16:
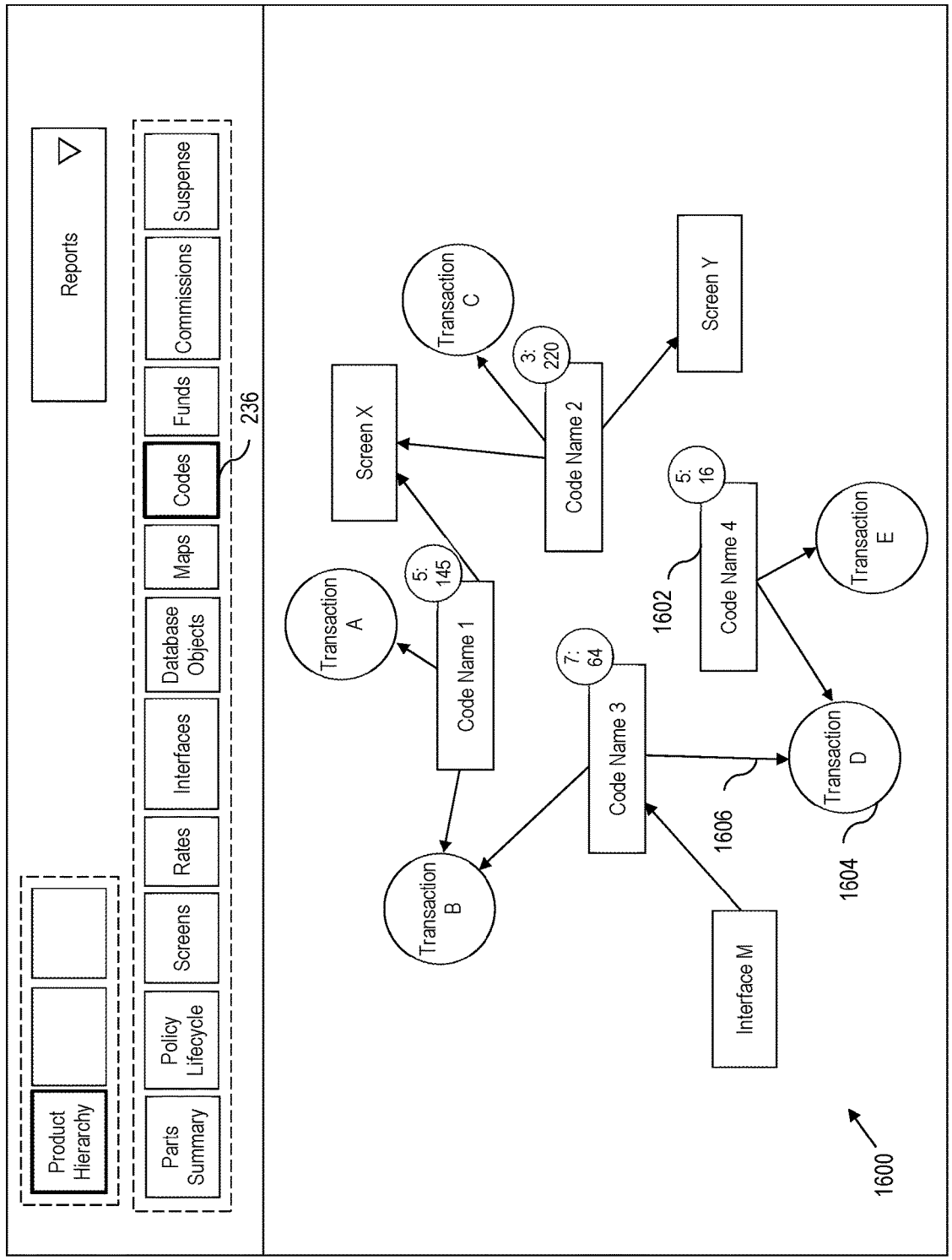
FIG. 16 illustrates an example codes diagram presented in the diagram pane of the computer interface.

Referring to FIG. 16, in an example implementation, upon a user selecting the codes control object 236 in the level two control objects 210 of the control pane 202, the tool graphically displays a codes diagram 1600.

The diagram is generated by decomposing the associated digital product into an entity diagram of entity nodes connected by lines, where the entity nodes are defined based upon the viewpoint associated with the user-selected control object. Here, the viewpoint is defined as a codes context. Moreover, the generated entity diagram includes code names within a current scope as nodes, transactions within the current scope as nodes, configured objects that access a corresponding one of the code names as nodes, and lines that interconnect code names, transactions, and configured objects. In an example embodiment, the interface content is collected by parsing the underlying OIPA rules based upon a rules engine that associates OIPA information with code names, transactions, and configured object information, etc., as required by the associated diagram.

In the example implementation, the codes diagram 1600 shows the individual Code Names (from AsCode table) that are applicable to the current scope as nodes 1602 in the middle, and other objects 1604 that use the Codes that belong to these Code Names along the perimeter. Lines 1606 connect the objects to the Code Name nodes using arrows that show the direction of interaction. A yellow stats circle over the top right corner of each Code Name node will show the number of Codes.

User selection of an item in the table triggers the tool to update the summary pane with useful information relevant to that object. Moreover, user selection of a Code Name triggers the tool to drill-down to the Code Context level for that item (see below).

Code Context

Figure 17:
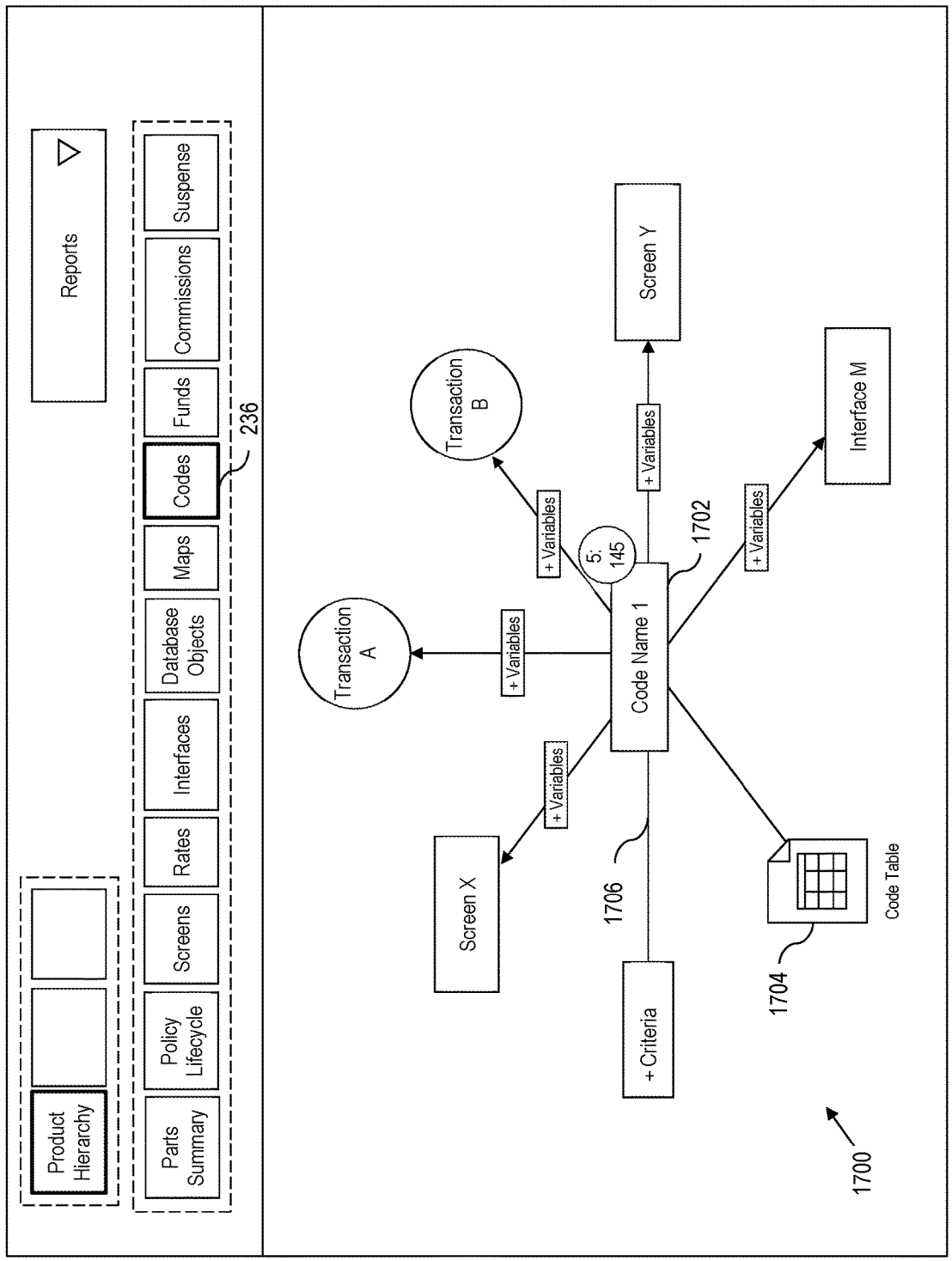
FIG. 17 illustrates an example drill-down of the codes diagram of FIG. 16.

Referring to FIG. 17, in an example implementation, a diagram 1700 focuses on the chosen Code Name as a node 1702 in the center. The diagram can also show all other objects 1704 from the list below that interacts with the chosen code name. Example objects include transactions that access the Code Name with an expandable list of directly impacted variables on the line and functions that access the Code Name with an expandable list of directly impacted variables on the line. The tool graphically connects any transactions or screens that use the functions with lines having arrows 1706 to show direction. CopyBooks can access the Code Name with an expandable list of directly impacted variables. Moreover, the diagram can connect any transactions or screens that use the copybook with lines having arrows to show direction. Yet further, screens that access the Code Name directly can be presented with a expandable list of directly impacted variables on the line. Also, interfaces can insert or access the Code Name with an expandable list of directly impacted variables.

The tool connects the code names with arrows showing the direction of the interaction (where applicable). If the interaction is conditional, the tool graphically displays a small yellow triangle on the line. All objects respond to user input, e.g., single/double-clicks as described previously User selection of an item in the table triggers the tool to update the summary pane with useful information relevant to that object.

Fund Diagram

Figure 18:
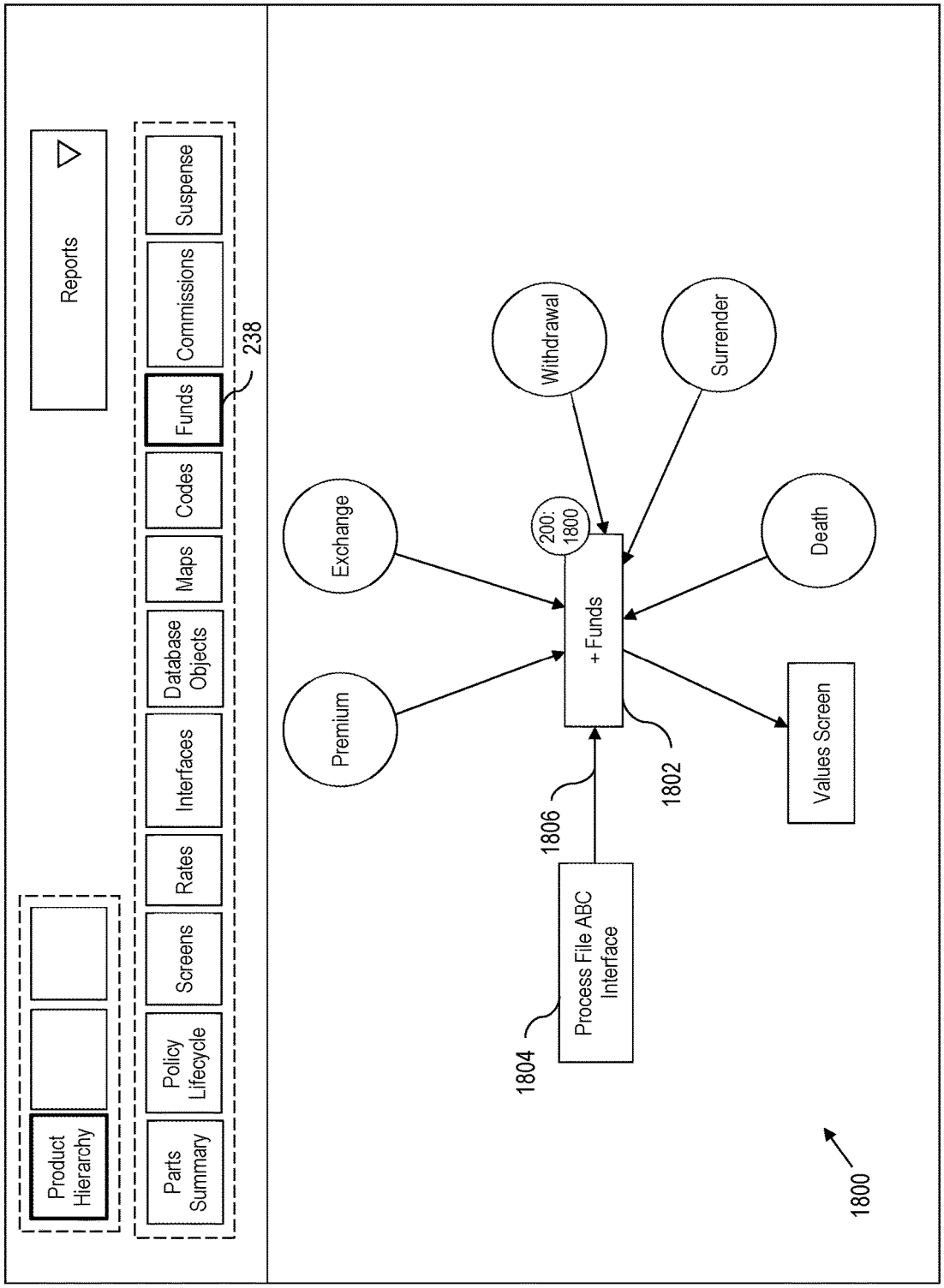
FIG. 18 illustrates an example funds diagram presented in the diagram pane of the computer interface.

Referring to FIG. 18, in an example implementation, upon a user selecting the funds control object 238 in the level two control objects 210 of the control pane 202, the tool graphically displays a fund diagram 1800.

The diagram is generated by decomposing the associated digital product into an entity diagram of entity nodes connected by lines, where the entity nodes are defined based upon the viewpoint associated with the user-selected control object. Here, the viewpoint is defined as a fund context. Moreover, the generated entity diagram includes grandparent funds within a current scope as nodes, transactions within the current scope as nodes, configured objects that access a corresponding one of the grand-parent funds as nodes, and lines that interconnect grand-parent funds, transactions, and configured objects. In an example embodiment, the interface content is collected by parsing the underlying OIPA rules based upon a rules engine that associates OIPA information with grand-parent funds, transactions, and configured object information, etc., as required by the associated diagram.

In an example implementation, the fund diagram 1800 represents all grand-parent funds applicable to the current scope with a blue expandable node 1802 at the center and shows other objects 1804 that use funds around the perimeter. Lines 1806 connect the objects to the Funds node using arrows that show the direction of interaction. A yellow stats circle over the top right corner of the Funds node will show the stats in this format<number of grand-parent funds>: <total number of funds>.

User selection of an item in the table triggers the tool to update the summary pane with useful information relevant to that object. Moreover, expanding the Funds node and selecting a specific parent fund in the list triggers the tool to drill-down to the Fund Hierarchy level for that parent fund. Also, user selection of a transaction triggers the tool to drill-down to the Transaction Fund Context level for that transaction.

Fund Hierarchy

Figure 19:
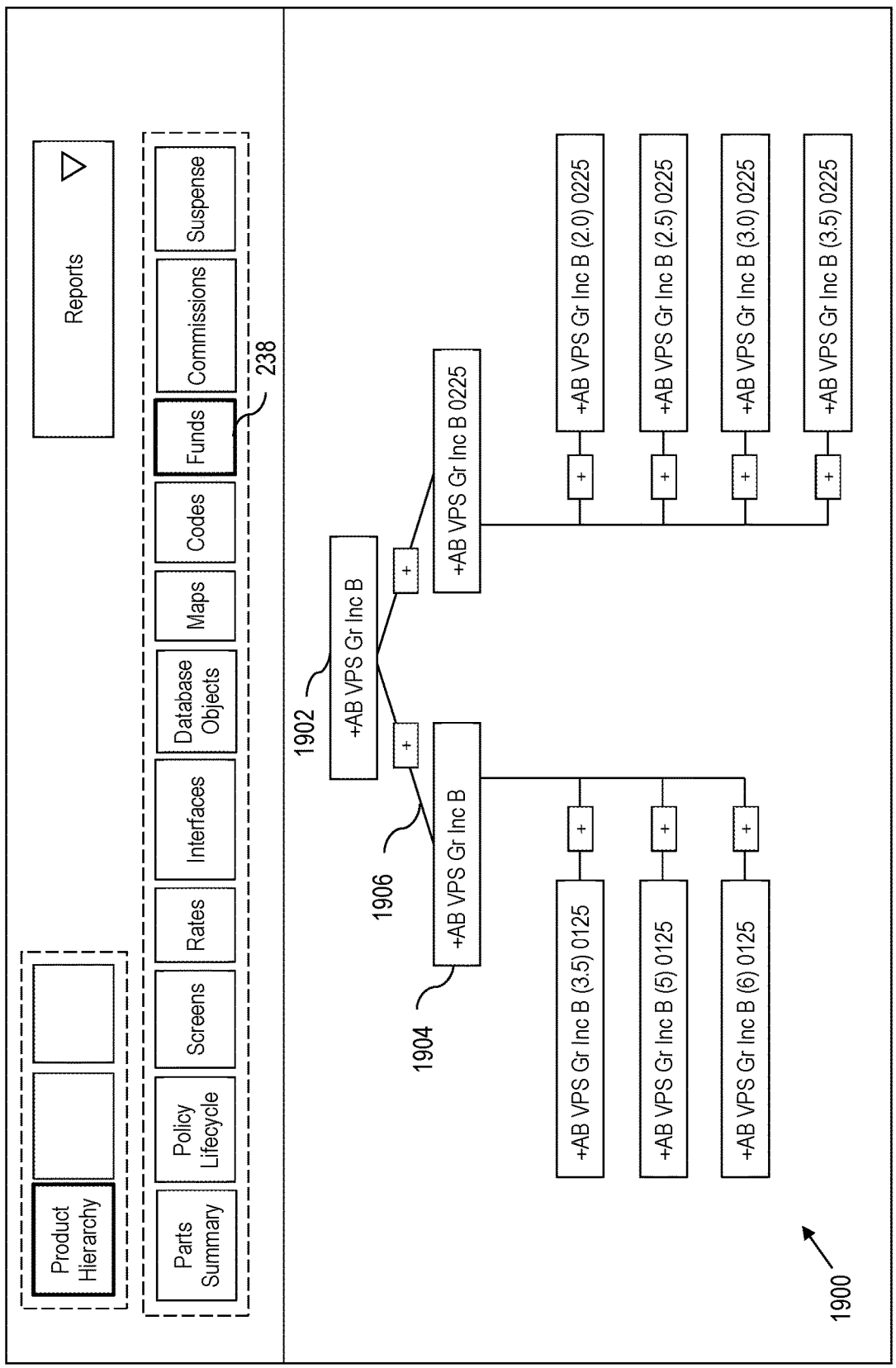
FIG. 19 illustrates an example drill-down of the funds diagram of FIG. 18.

Referring to FIG. 19, a diagram 1900 shows an example hierarchy of funds configured starting from the selected grand-parent fund 1902. The tool graphically displays each fund as a node 1904 that contains an expandable list of fund fields. In the illustrated example, the funds are connected by lines 1906 to depict the hierarchy. The tool also graphically displays an expandable list of fund relation fields on each line that connects two funds.

User selection of a fund node triggers the tool to update the summary pane with useful information relevant to that fund, such as the Fund Type (Variable, fixed, ABL, etc.), Fund Classes it belongs to, etc.

Transaction Fund Context

Figure 20:
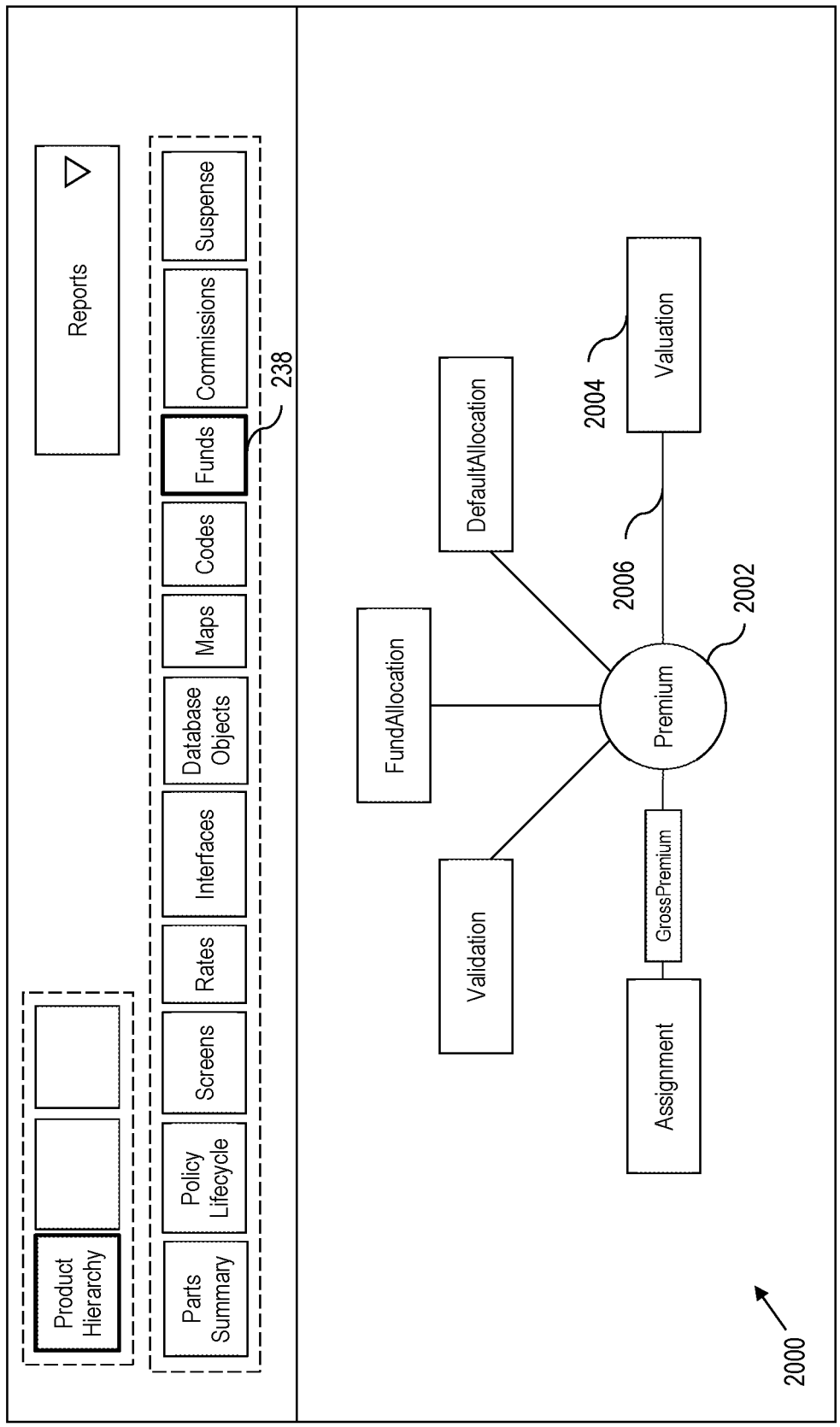
FIG. 20 illustrates another example drill-down of the funds diagram of FIG. 18.

Referring to FIG. 20, a diagram 2000 illustrates an example of a selected transaction in the middle as a circle 2002 and shows each of the fund-related tags 2004 configured in the Transaction, such as Assignment, Valuation, Fund Allocation, etc., around the transaction. Lines 2006 connect the transaction to each of the fund configuration nodes using lines. If a fund configuration uses a math variable, show its name on the line as a green node.

User selection of a fund configuration node triggers the tool to update the summary pane with useful information relevant to that object. Moreover, user selection of a math variable node triggers the tool to drill-down to the Flowchart depicting how that variable is calculated.

Commissions Diagram

Figure 21:
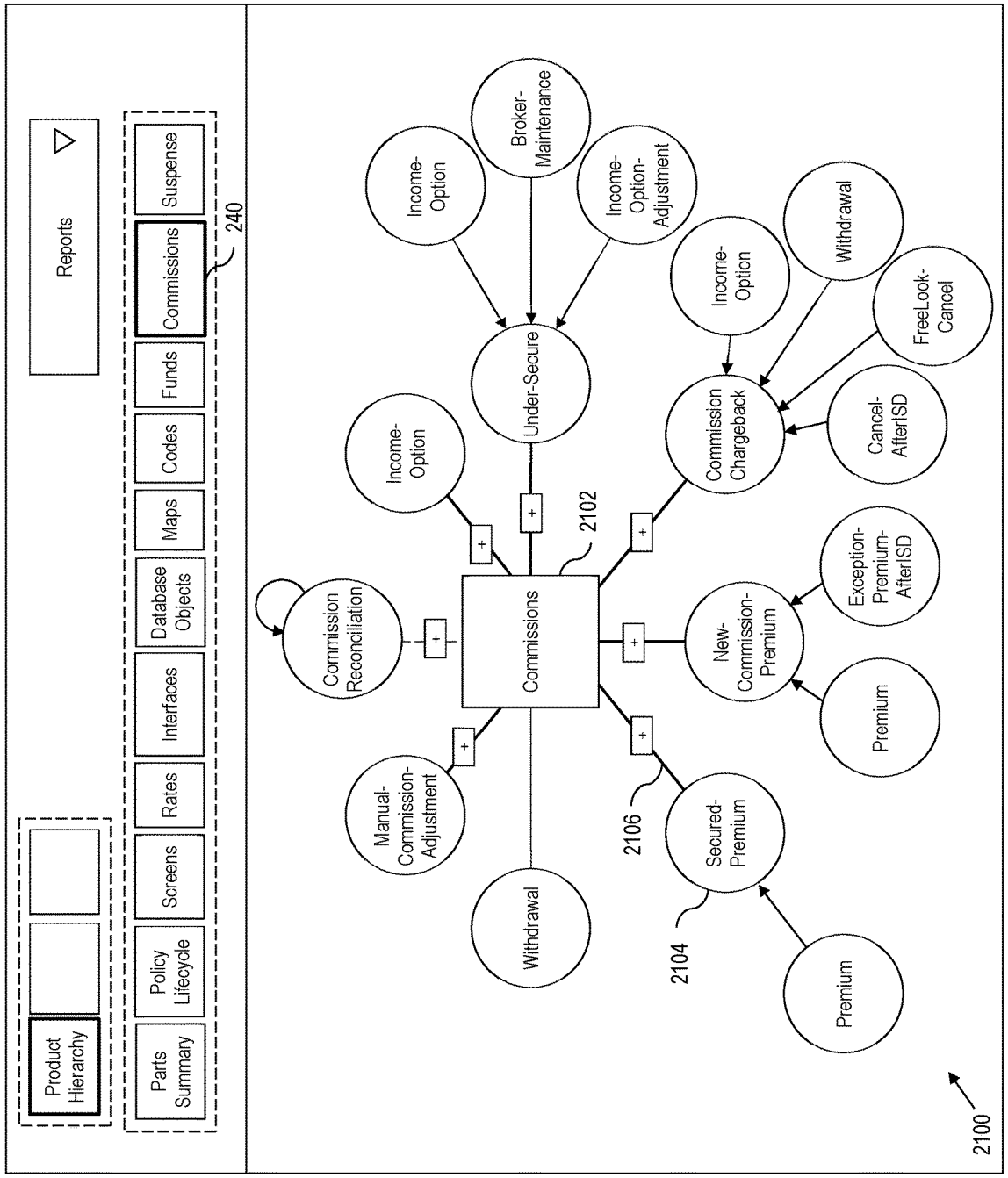
FIG. 21 illustrates an example commissions diagram presented in the diagram pane of the computer interface.

Referring to FIG. 21, in an example implementation, upon a user selecting the commissions control object 238 in the level two control objects 210 of the control pane 202, the tool graphically displays a commissions diagram 2100.

The diagram is generated by decomposing the associated digital product into an entity diagram of entity nodes connected by lines, where the entity nodes are defined based upon the viewpoint associated with the user-selected control object. Here, the viewpoint is defined as a commissions context that shows transactions that generate commission data and how they are spawned. Moreover, the generated entity diagram includes commission data within a current scope as nodes, transactions within the current scope that have a commission attached rule as nodes, a first line type to connect transactions that generate commission details, and update fields and status, a second line type to connect transactions that generate commission details but do not update fields or status, a third line type to connect transactions that update fields or status, but do not generate details, spawned transactions as nodes, and lines that connect transactions to spawned transactions. In an example embodiment, the interface content is collected by parsing the underlying OIPA rules based upon a rules engine that associates OIPA information with commission data, transactions that have a commission attached rule, a first line type, a second line type, a third line type, and spawned transactions, etc., as required by the associated diagram.

In the example illustrated, the commissions diagram 2100 shows transactions that generate commission data and how they are spawned. The tool graphically displays a node 2102 at the center, identified as "Commissions" to represent commission data. Moreover, the tool can graphically display all transactions 2104 that have one of the commission attached rules, e.g., (Generate_Commission_Details, Update_Commission Detail_Status, or Copy_To_Commission_Detail_Fields) as circles around the node at center. In an example implementation, the tool sets the color, e.g., all User transactions in blue, System transactions in red, and those transactions that are both User and System in purple. The diagram 2100 connects the transactions to the Commissions node using lines 2106, and show an expandable list of fields on the line for all transactions that update Commission_Detail_Fields or Commission_Status, containing all fields updated by that transaction.

The tool can utilize graphic distinguishing features/elements. For instance, in an example embodiment, the tool uses a first line type, e.g., thick solid lines, to connect transactions that generate Commission Details, and update Fields and Status. The tool uses a second line type, e.g., thin solid lines, to connect transactions that generate Commission Details but do not update Fields or Status. The tool uses a third line type, e.g., dotted lines to connect transactions that update Fields or Status, but do not generate Details.

Subsequently, the tool graphically displays any transactions that spawn the displayed System or System-and-User transactions around the perimeter. The tool can use visual cues, e.g., color coded transactions as noted more fully herein, and connect the transactions to the respective spawned transactions using arrows that indicate the direction of spawning. The tool shows any self-spawning transactions as a curved arrow pointing to itself.

Suspense

Figure 22:
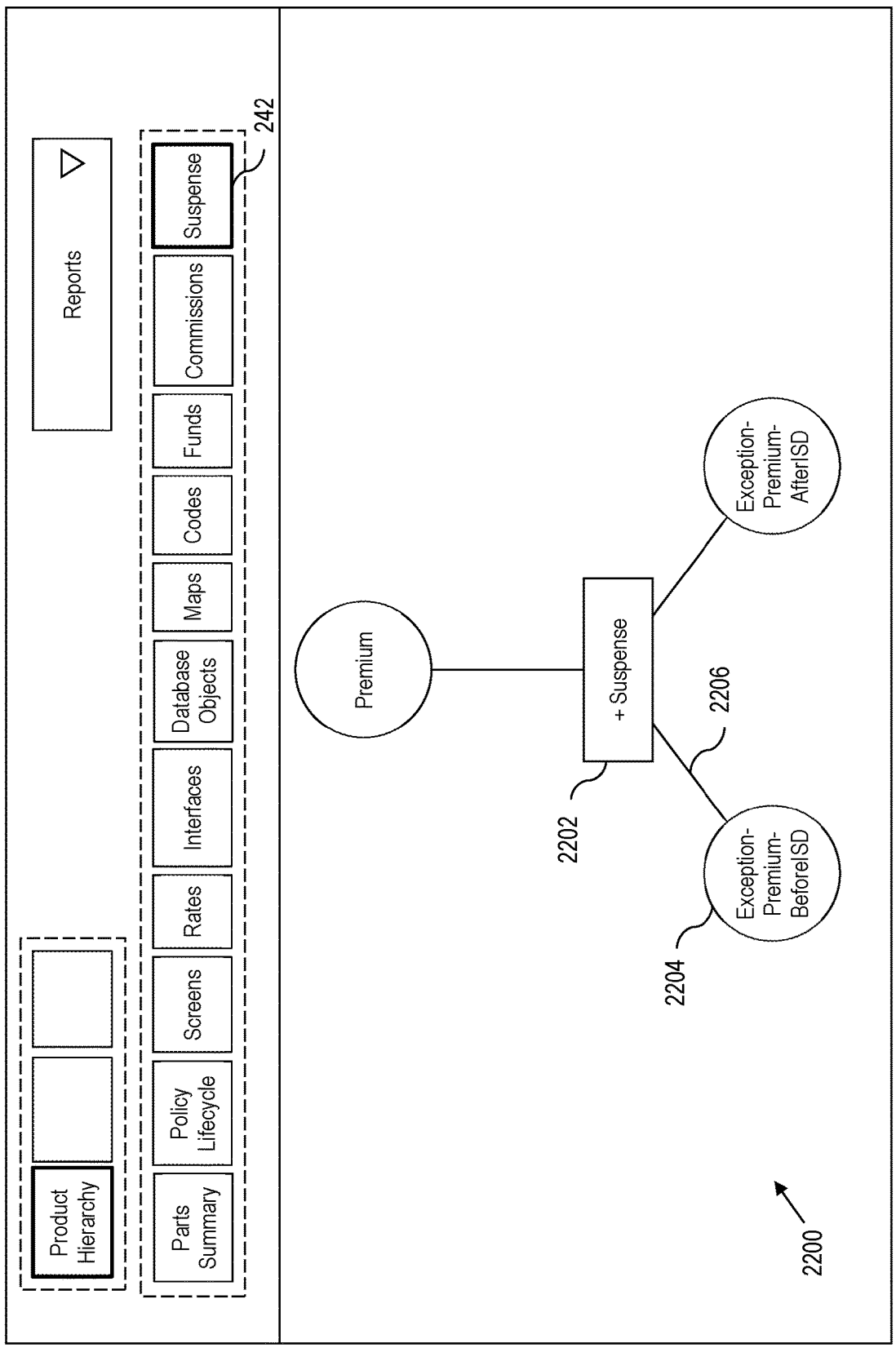
FIG. 22 illustrates an example top-level suspense diagram presented in the diagram pane of the computer interface.

Referring to FIG. 22, in an example implementation, upon a user selecting the suspense control object 242 in the level two control objects 210 of the control pane 202, the tool graphically displays a suspense diagram 2200.

The diagram is generated by decomposing the associated digital product into an entity diagram of entity nodes connected by lines, where the entity nodes are defined based upon the viewpoint associated with the user-selected control object. Here, the viewpoint is defined as a suspense context. Moreover, the generated entity diagram includes suspense data within a current scope as nodes and transactions. In an example embodiment, the interface content is collected by parsing the underlying OIPA rules based upon a rules engine that associates OIPA information with suspense data, transactions that that read or write suspense, and interconnecting lines.

In the illustrated example, the suspense diagram 220 shows transactions that read from or write to suspense and how they are spawned. The tool graphically displays an expandable list of Suspense fields (from a Suspense Screen) in a node 2202 at the center, designated "Suspense" to represent Suspense data. The tool graphically displays all transactions that read or write suspense (via a suspense tag or attached rules) as circles 2204 around the node at the center, connected by lines 2206. In an example implementation, the tool sets a color, e.g., all User transactions in blue, System transactions in red, and those transactions that are both User and System in purple.

System Overview

Figure 23:
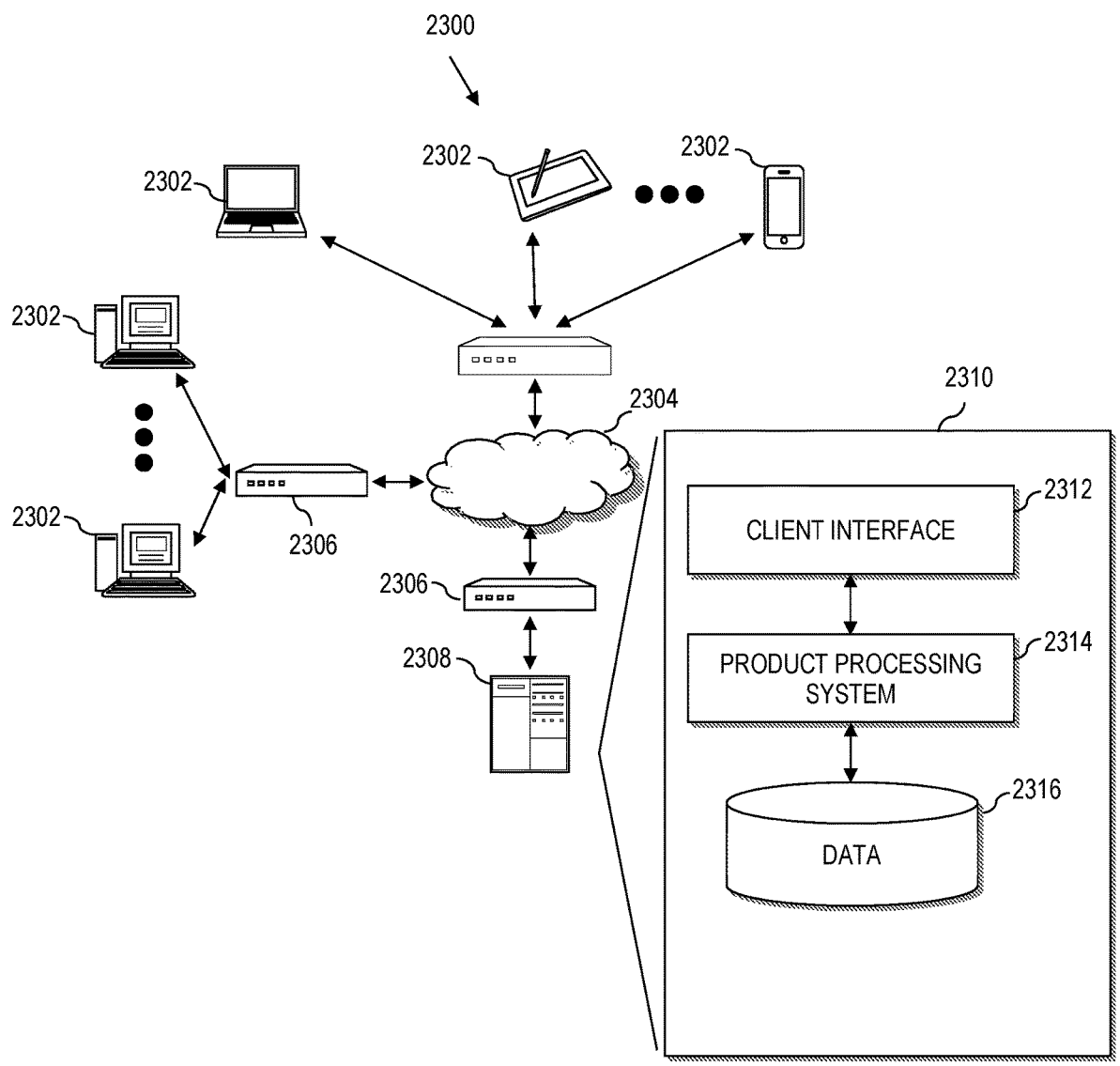
FIG. 23 is a block diagram of an example electronic platform that facilitates viewing and building digital products, according to aspects of the present disclosure.

Referring to FIG. 23, a general diagram of an environment 2300 is illustrated showing an example computing environment capable of supporting the tools herein. The illustrated environment 2300 is a special purpose (particular) computing environment that includes a plurality of hardware processing devices 2302 that are linked together by one or more network(s) 2304.

A processing device 2302 can be implemented as a server, personal computer, laptop computer, netbook computer, tablet computer, smart phone, purpose-driven appliance, special purpose computing device, and/or other device capable of communicating over the network(s) 2304.

The network(s) 2304 enable communications links between the various processing devices 2302 and may be supported by networking components 2306 that interconnect the processing devices 2302. Here, the network(s) 104 may comprise connections using one or more intranets, extranets, local area networks (LAN), wide area networks (WAN), wireless networks (WiFi), the Internet, including the world-wide web, cellular, and/or other arrangements for enabling communication between the processing devices 2302, in either real time or otherwise (e.g., via time shifting, batch processing, etc.). Networking components 2306 include for example, routers, hubs, firewalls, network interfaces, wired or wireless communications links and corresponding interconnections, cellular stations, and corresponding cellular conversion technologies (e.g., to convert between cellular and TCP/IP, etc.).

The illustrated environment 2300 includes a processing device implemented as a server 2308 (e.g., a cloud server, web server, file server, and/or other processing device) that implements an electronic tool 2310. The electronic tool 2310 can be utilized to implement a digital product generation and navigation tool, as described more fully herein.

For instance, in the example implementation, the electronic tool 2310 includes a client interface 2312 for interfacing with client devices, e.g., the processing devices 2302. The client interface 2312 connects client devices to a product processing system 2314.

The product processing system 2314 presents digital products in a user-navigable and visual presentation, via the client interface 312 and/or any rendering capability provided by client processing device 2302, e.g., via a web browser, e.g., using the features, techniques, and flows herein.

The product processing system 2314 is also communicably couple to at least one data source 2316. The data source(s) 2316 store the product data and provide any other resources needed by the product processing system 2314. In an example embodiment, the data source(s) 2316 store digital products built using the Oracle Insurance Policy Administration (OIPA) system. While certain aspects of the present disclosure are not intended to be limited to a specific type of digital product, an example is provided herein where the product processing system 2314 functions in the context of a Reverse Engineering Tool that is used to build digital products such as insurance products, and/or to visualize such digital insurance products in a hierarchical, and user-navigable view.

The product processing system 2314 implements a tool that generates specifications automatically from the details implemented in the system. The specifications can be at different levels of details and depict the product from different viewpoints, thus enabling comprehensive auditing and modularization that enables new products to be built quickly. In this regard, a few example interface views are set out in the preceding FIGURES. These examples are presented by way of illustration, and not by way of limitation.

Example Computer System

Figure 24:
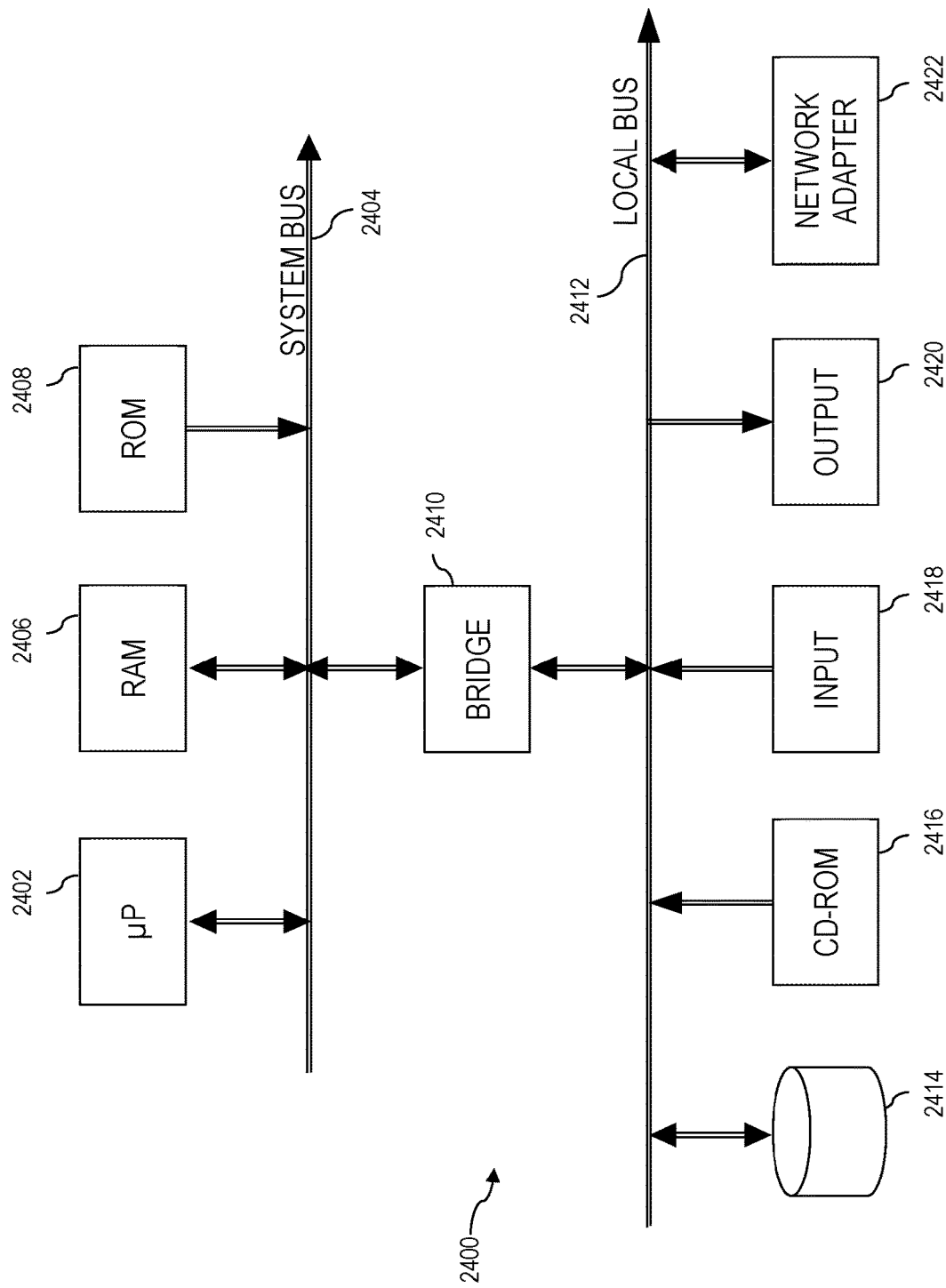
FIG. 24 is a block diagram of a computer system having a computer readable storage medium for implementing functions according to various aspects of the present disclosure as described in greater detail herein.

Referring to FIG. 24, a block diagram of a hardware data processing system is depicted in accordance with the present disclosure. Data processing system 2400 may comprise a symmetric multiprocessor (SMP) system or other configuration including one or more processors 2402 connected to system bus 2404. Also connected to the system bus 2404 is local memory, e.g., random access memory 2406 and/or read only memory 2408. An I/O bus bridge 2410 interfaces the system bus 2404 to an I/O Local bus 2412. The local bus 2412 is utilized to support one or more devices, such as storage 2414, removable media storage such as a CD-ROM or DVD-ROM 2416, input devices 2418, output devices 2420, network adapters 2422, other devices, combinations thereof, etc. For instance, a network adapter 2422 can be used to enable the data processing system 2400 to communicate with other data processing systems or remote printers or storage devices through intervening private or public networks.

The memory 2406, 2408, removable media storage 2414, or combinations thereof can be used to store program code that is executed by the processor(s) 2402 to implement any aspect of the present disclosure described and illustrated in FIGS. 1-23.

As will be appreciated by one skilled in the art, aspects of the present disclosure may be embodied as a system, method or computer program product. Moreover, some aspects of the present disclosure may be implemented in hardware, in software (including firmware, resident software, microcode, etc.), or by combining software and hardware aspects. Furthermore, aspects of the present disclosure may take the form of a computer program product embodied in one or more computer readable storage medium(s) having computer readable program code embodied thereon.

In certain embodiments, any combination of one or more computer readable medium(s) may be utilized. The computer readable medium may be a computer readable storage medium or a computer readable signal medium. A computer readable storage medium may be a primary storage device, or a secondary storage device (which may be internal, external, or removable from the host hardware processing device). Examples of a computer readable storage medium include, but not limited to, a portable computer diskette, a hard disk, a random access memory (RAM), a read-only memory (ROM), an erasable programmable read-only memory (EPROM), Flash memory, a portable compact disc read-only memory (e.g., CD-ROM, CD-R, CD-RW, DVD, Blu-Ray), or any suitable combination of the foregoing. In the context of this document, a computer readable storage medium may be any tangible (hardware) medium that can contain, or otherwise store a program for use by or in connection with an instruction system, apparatus, or device.

A computer readable signal medium may include a propagated data signal with computer readable program code embodied therein, for example, in baseband or as part of a carrier wave. Specifically, a computer readable signal medium is not a computer readable storage medium, and a computer readable storage medium is not a computer readable signal medium.

Program code embodied on a computer readable medium may be transmitted using any appropriate medium, including but not limited to wireless, wireline, optical fiber cable, RF, etc., or any suitable combination of the foregoing.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be carried out substantially concurrently, or the blocks may sometimes be carried out in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer-implemented process of generating user-navigable, graphical representations, comprising:
    generating, by a graphical user interface, a control pane and a diagram pane for output to a computer display, wherein:
        the control pane graphically depicts control objects that are each associated with a different viewpoint of digital products; and
        the diagram pane displays graphical representations based upon a user-selected control object in the control pane;
    generating, by the graphical user interface in the diagram pane, a view of a user-selected digital product, where computer readable information associated with the user-selected digital product is graphically associated with nodes and lines visually interconnect nodes based upon determined relationships therebetween;
    performing, based upon a user-selected control object in the control pane:
    decomposing the digital product into an entity diagram of entity nodes connected by lines, where the entity nodes are defined based upon the viewpoint associated with the user-selected control object, wherein the decomposing of the digital product comprises defining the viewpoint as a maps context and generating the entity diagram to graphically diagram maps and transactions within a current scope as nodes;
        generating the entity diagram to graphically diagram:
            maps within a current scope as nodes;
            transactions within the current scope as nodes;
            configured objects that access a corresponding one of the maps as nodes; and
            lines that interconnect maps, transactions, and configured objects; and
    presenting, via the graphical user interface, the entity diagram in the diagram pane.

2. The computer-implemented process of claim 1, wherein:
    a select control object in the control pane represents product hierarchies, the process further comprising:
    generating, by the graphical user interface in the diagram pane, a hierarchical view of digital products by:
        presenting, via the graphical user interface, a product hierarchy diagram in the diagram pane, wherein digital products are visually represented as nodes, and
        receiving, via the graphical user interface, a user selection of a node displayed within the diagram pane, designating the user-selected digital product.

3. The computer-implemented process of claim 2 further comprising:
    presenting the product hierarchy diagram whenever the user selects a product hierarchy control object; and
    graphically displaying in addition to the products within the product hierarchy diagram, a company associated with each of the products, and a plan associated with at least one sub-product;
    wherein:
        selecting a bottom node in the displayed product hierarchy diagram is responsive to a first user input displays summary information about the selected node in a summary pane; and
        selecting the bottom node in the displayed product hierarchy diagram, responsive to a second user input displays a parts summary, graphically depicts parts that are in scope for a selected entity associated with the selected node.

4. The computer-implemented process of claim 2, wherein generating, by the graphical user interface in the diagram pane, a hierarchical view of digital products further comprises graphically displaying, for at least one node associated with a corresponding digital product, a number of transactions overridden, a number of overridden rules, or both.

5. The computer-implemented process of claim 1 further comprising:
   performing, responsive to a first user input selecting an entity node, displaying predefined summary level fields with data values specific to the user-selected digital product and entity node; and
   performing, responsive to a second user input selecting the entity node, drilling down into the user-selected entity node and presenting information specific to the computer readable information associated with the user-selected entity node.

6. The computer-implemented process of claim 1, wherein the decomposing of the digital product further comprises:
   defining the viewpoint as a policy lifecycle of an insurance policy; and
   generating the entity diagram as a state diagram that graphically diagrams policy statuses as the entity nodes and transactions as interconnecting lines.

7. A computer-implemented process of generating user-navigable, graphical representations, comprising:
   generating, by a graphical user interface, a control pane and a diagram pane for output to a computer display, wherein:
      the control pane graphically depicts control objects that are each associated with a different viewpoint of digital products; and
      the diagram pane displays graphical representations based upon a user-selected control object in the control pane;
   generating, by the graphical user interface in the diagram pane, a hierarchical view of digital products, where each digital product is comprised of computer readable information and is graphically associated with a node, wherein lines visually interconnect nodes based upon determined hierarchical relationships between the digital products;
   receiving, via the graphical user interface, a user selection of a node displayed within the diagram pane, designating a user-selected digital product; and
   performing, based upon a user-selected control object in the control pane and the user selected node:
      decomposing the digital product into an entity diagram of entity nodes connected by lines, where the entity nodes are defined based upon the viewpoint associated with the user-selected control object, wherein the decomposing of the digital product comprises defining a viewpoint as a policy lifecycle of an insurance policy and generating the entity diagram as a state diagram that graphically diagrams policy statuses as the entity nodes and transactions as interconnecting lines; and
      presenting, via the graphical user interface, the entity diagram in the diagram pane;
   performing, responsive to a first user input selecting an entity node, displaying predefined summary level fields with data values specific to the user-selected digital product and entity node; and
   performing, responsive to a second user input selecting the entity node, drilling down into the user-selected entity node and presenting information specific to the computer readable information associated with the user-selected entity node.

8. A computer-implemented process of generating user-navigable, graphical representations, comprising:
   generating, by a graphical user interface, a control pane and a diagram pane for output to a computer display, wherein:
      the control pane graphically depicts control objects that are each associated with a different viewpoint of digital products; and
      the diagram pane displays graphical representations based upon a user-selected control object in the control pane;
   initially displaying in the diagram pane, a hierarchical view of digital products by:
      presenting, via the graphical user interface, a product hierarchy diagram in the diagram pane, wherein digital products are visually represented as nodes, and
      receiving, via the graphical user interface, a user selection of a node displayed within the diagram pane, designating the user-selected digital product;
   generating, by the graphical user interface in the diagram pane, a view of the user-selected digital product, where computer readable information associated with the user-selected digital product is graphically associated with nodes and lines visually interconnect nodes based upon determined relationships therebetween;
   performing, based upon a user-selected control object in the control pane and the user selected node:
   decomposing the digital product into an entity diagram of entity nodes connected by lines, where the entity nodes are defined based upon the viewpoint associated with the user-selected control object, wherein the decomposing of the digital product comprises at least one of:
      defining a viewpoint as a policy lifecycle of an insurance policy and generating the entity diagram as a state diagram that graphically diagrams policy statuses as the entity nodes and transactions as interconnecting lines; or
      defining a viewpoint as a maps context and generating the entity diagram to graphically diagram maps and transactions within a current scope as nodes; and
   presenting, via the graphical user interface, the entity diagram in the diagram pane.

* * * * *